June 6, 1944.    H. S. WYNN    2,350,657
CODED TRACK CIRCUIT SIGNALING SYSTEM
Filed Nov. 21, 1942    9 Sheets-Sheet 1
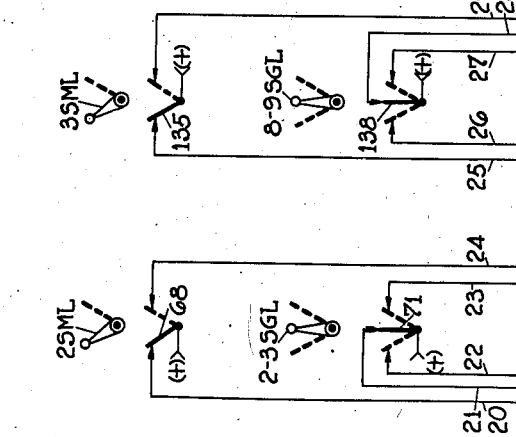
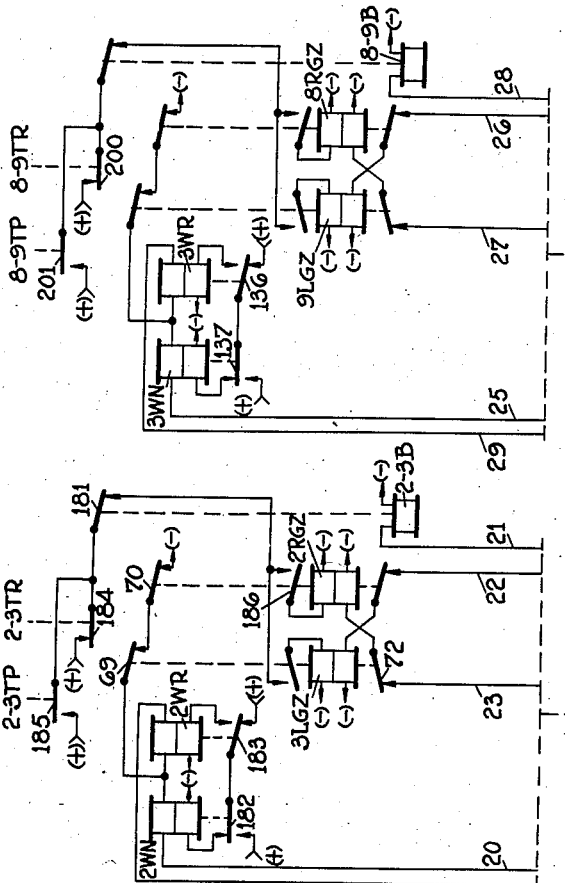
INVENTOR
H. S. Wynn,
BY Neil L. Ralston,
his ATTORNEY

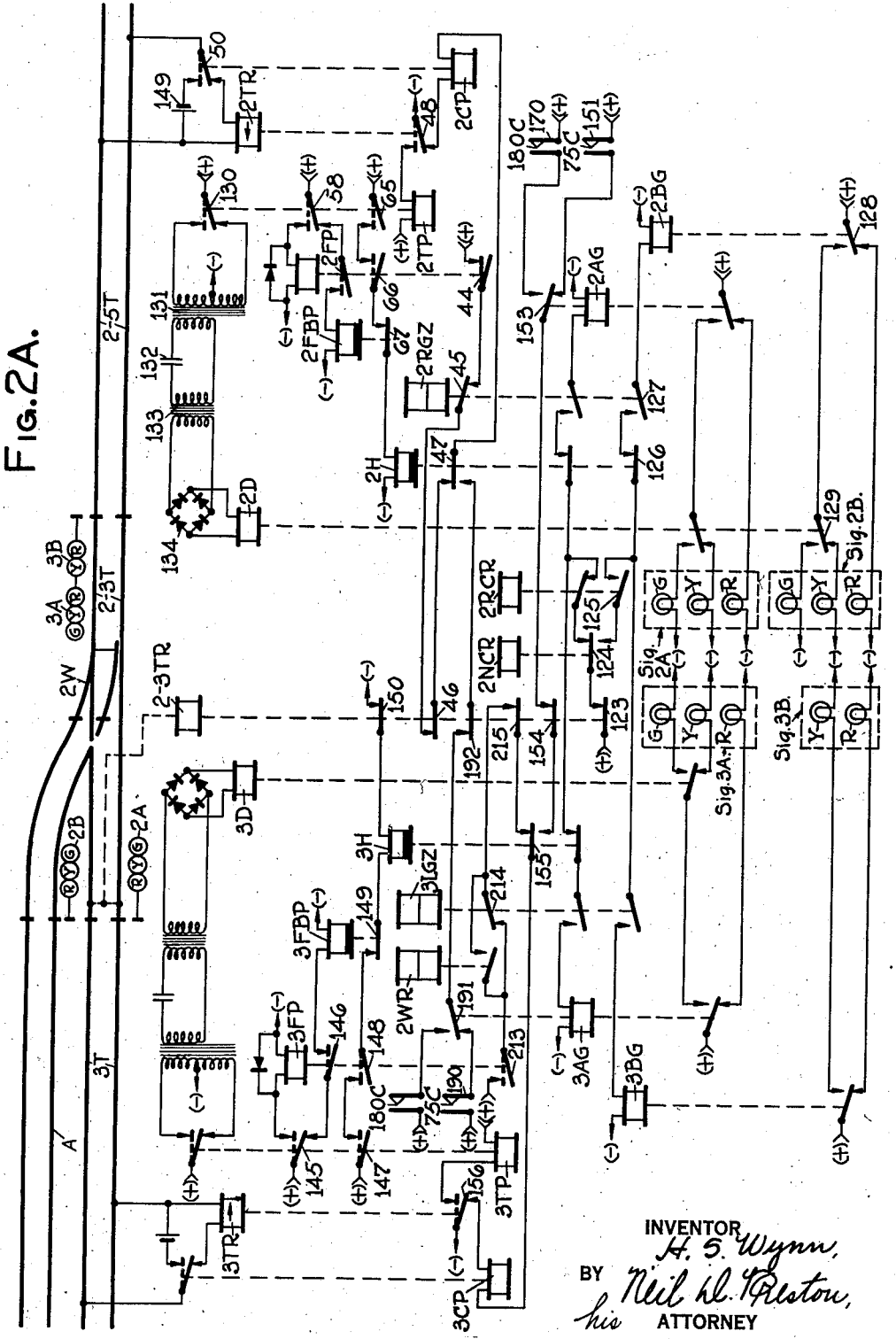

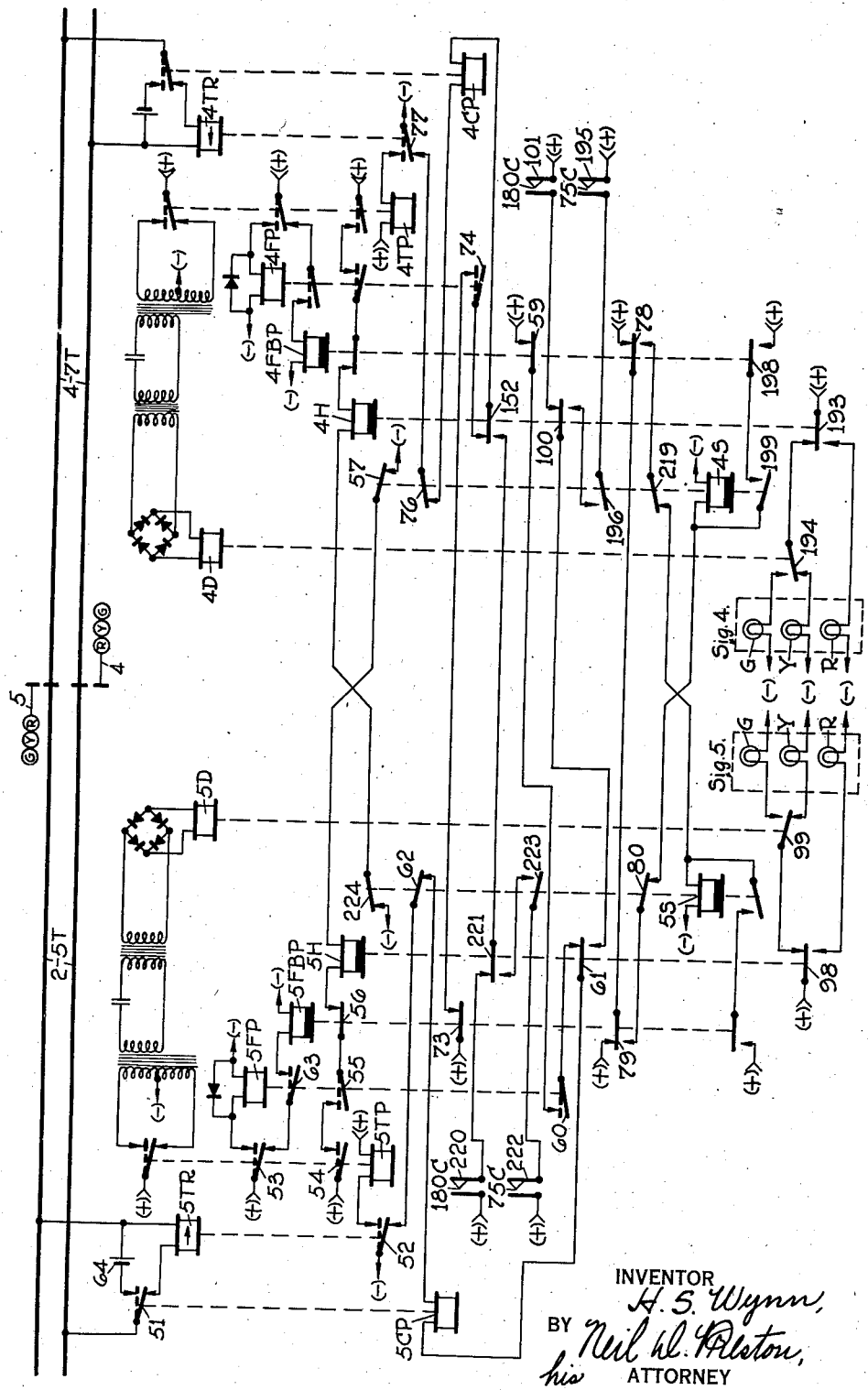

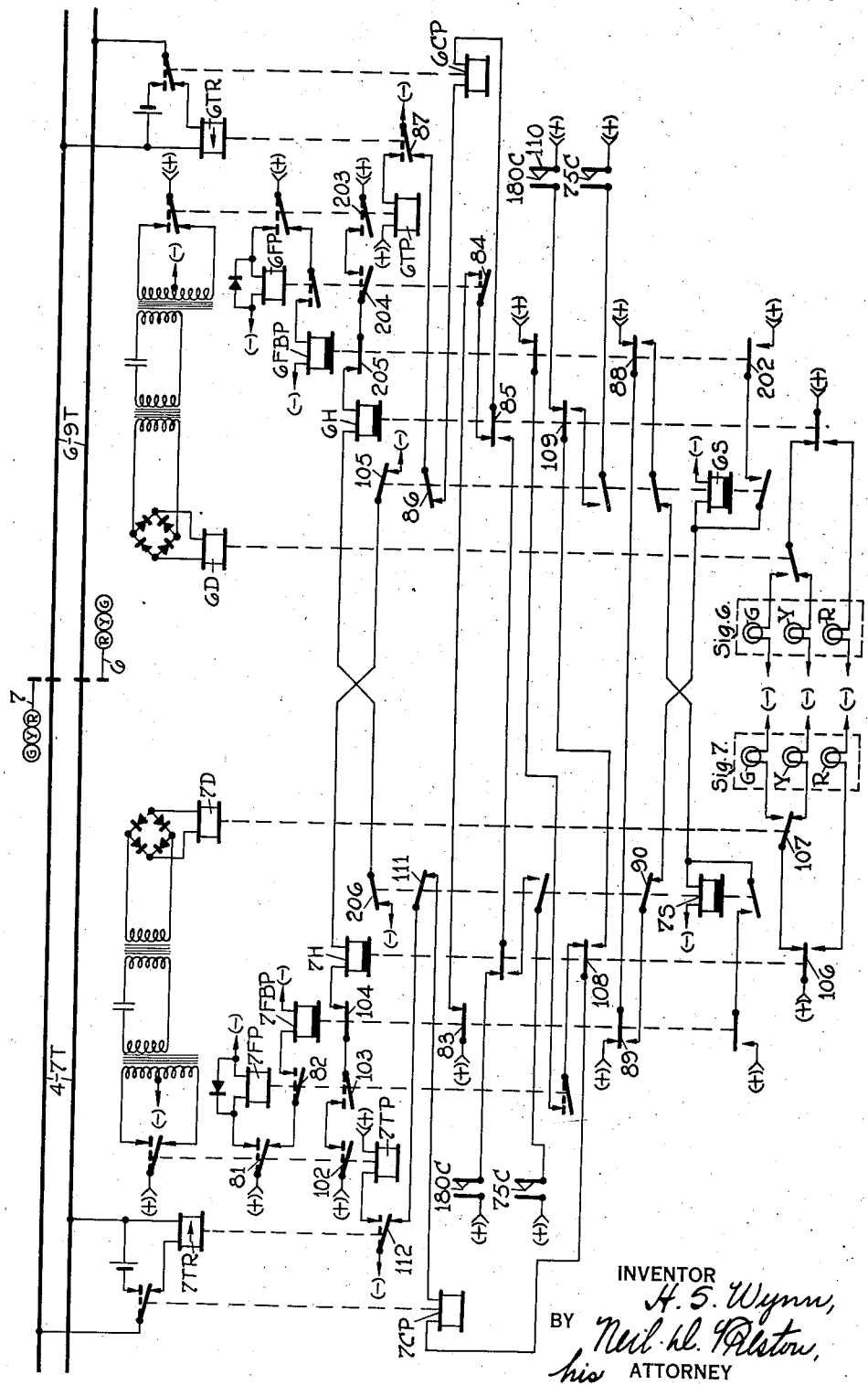

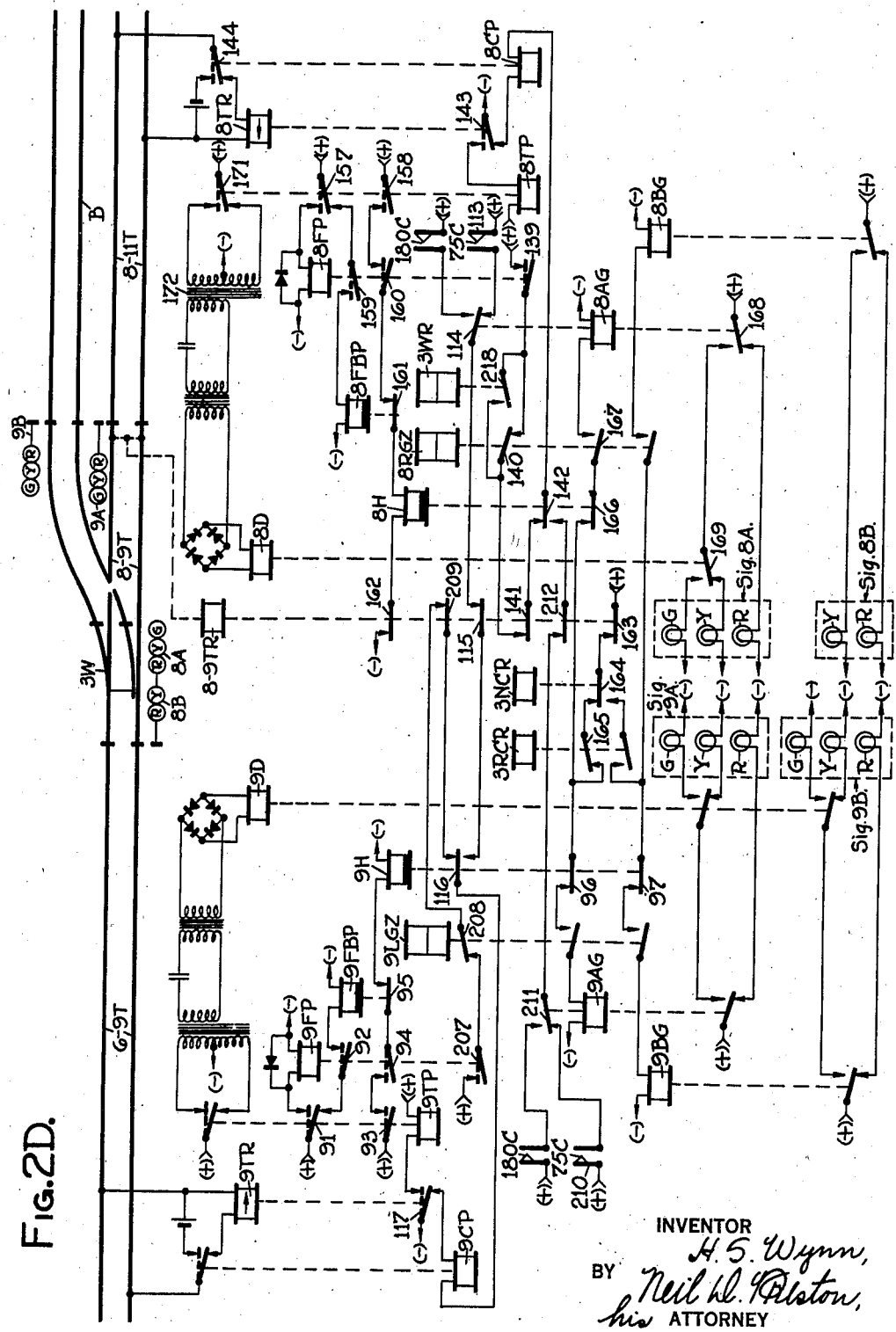

June 6, 1944.    H. S. WYNN    2,350,657
CODED TRACK CIRCUIT SIGNALING SYSTEM
Filed Nov. 21, 1942    9 Sheets-Sheet 6
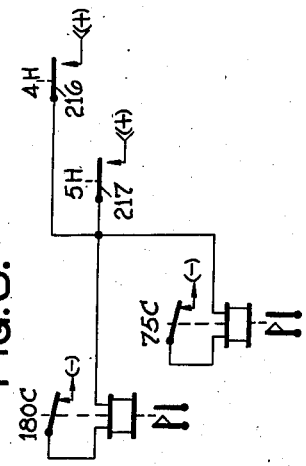
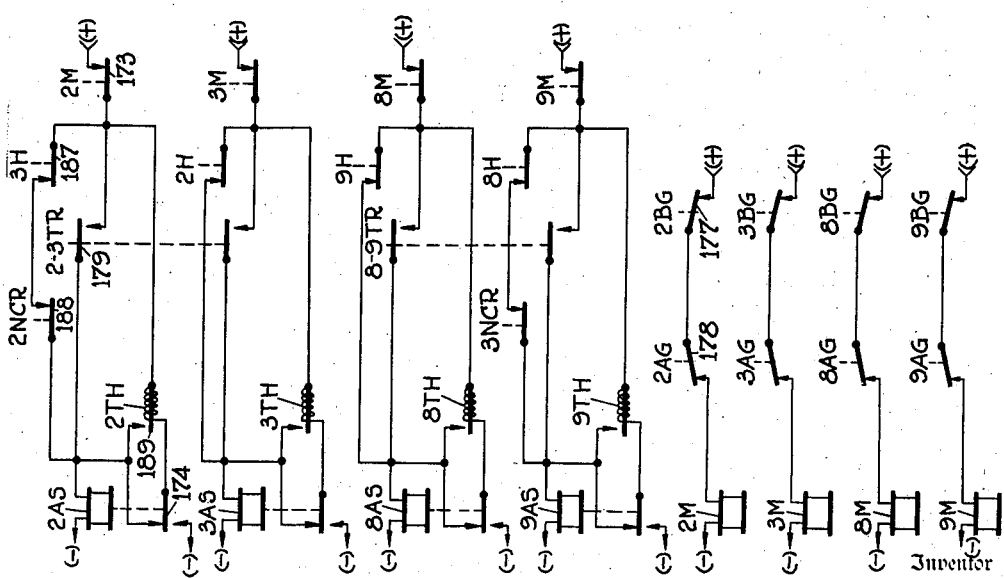
Inventor
H. S. Wynn,
Neil H. Preston,
his Attorney June 6, 1944. H. S. WYNN 2,350,657
CODED TRACK CIRCUIT SIGNALING SYSTEM
Filed Nov. 21, 1942 9 Sheets-Sheet 7

Inventor
H. S. Wynn,
Neil W. Preston,
By his Attorney

June 6, 1944. H. S. WYNN 2,350,657
CODED TRACK CIRCUIT SIGNALING SYSTEM
Filed Nov. 21, 1942 9 Sheets-Sheet 8
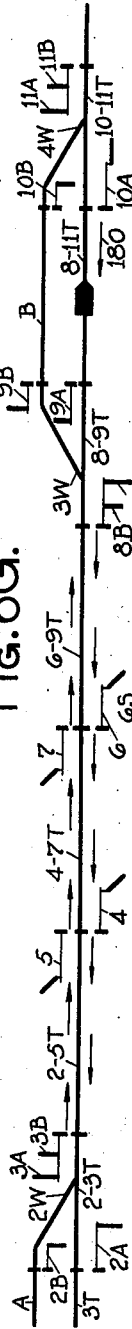
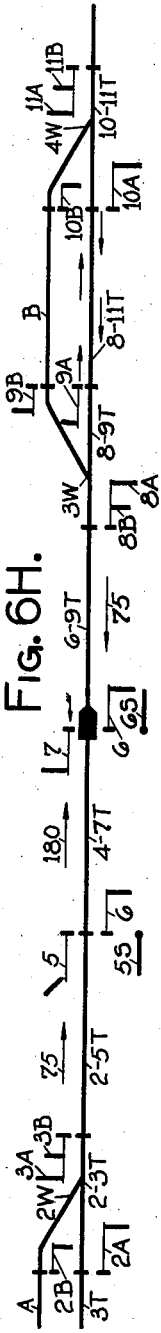
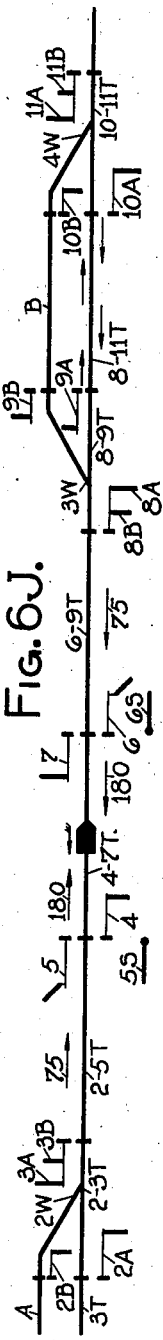
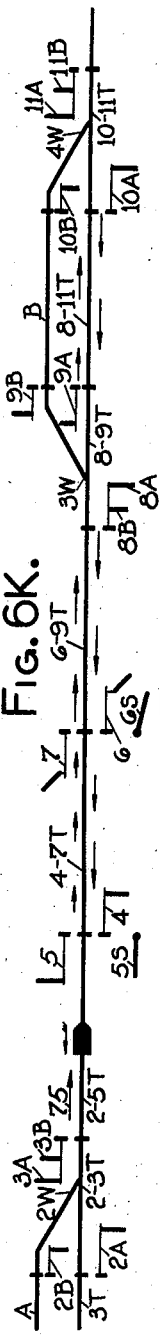
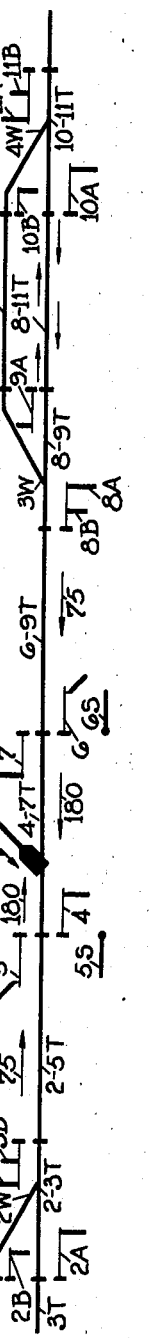
Inventor
H. S. Wynn,
Neil W. Alston,
his Attorney June 6, 1944.  H. S. WYNN  2,350,657
CODED TRACK CIRCUIT SIGNALING SYSTEM
Filed Nov. 21, 1942   9 Sheets-Sheet 9

Inventor
H. S. Wynn,
Neil D. Preston,
his Attorney

Patented June 6, 1944

2,350,657

UNITED STATES PATENT OFFICE 2,350,657

CODED TRACK CIRCUIT SIGNALING SYSTEM

Harold S. Wynn, Pittsford, N. Y., assignor to General Railway Signal Company, Rochester, N. Y.

Application November 21, 1942, Serial No. 466,406

24 Claims. (Cl. 246—3)

This invention relates to coded track circuit signaling systems for railroads, and it more particularly pertains to a system for single track railroads used in combination with centralized traffic control.

The general organization of the system provided by the present invention is that the automatic control of signals spaced along a single track railway having passing sidings is effected by the transmission of continuous coded controls through the track rails of the various track sections between signal locations. The groups of signals which are located adjacent the ends of the passing sidings are subject to manual control from a central control office. Such groups of signals, together with the field apparatus for their control, are conveniently called field stations. Although the signals at the respective field stations can be controlled manually from the control office by direct wire control, in most cases where there are several field stations involved, for the purpose of saving line wires, it is more desirable that a code type communication system be employed as is shown, for example, in the patent to Judge et al., No. 2,082,544, dated June 1, 1937, or in the patent to Hailes et al., No. 2,259,561, dated October 21, 1941.

The present invention is an improvement in the coded track circuit signaling system disclosed in the prior application of Judge, Ser. No. 455,922, filed August 24, 1942, and no claim is made herein to that which is disclosed in such application.

An object of the present invention is to provide a system of self-coding in a track circuit whereby code impulses are transmitted in both directions at the same time, the respective impulses for the two directions being transmitted in alternate relationship, and each impulse being transmitted only in response to a prior impulse transmitted from the opposite end of the track section. The transmission of each impulse is dependent upon a preceding impulse transmitted from the opposite end of the track section in that the duration of the impulse is timed, for example, by the drop-away time of a track repeater relay picked up by such preceding impulse, thus causing the track circuit to be self-coding.

Another object of the present invention is to employ self-coding in the coded track circuits normally as a potential tumble-down medium by which opposing manually controlled signals can be interlocked for either selected direction of traffic without requiring the use of special traffic direction control relays for governing the direction of code transmission.

Another object of the present invention is to materially slow down the coding in the track sections when there are no routes established as compared to 75 and 180 code rates selectively applied for the control of signals in established routes. The code is materially slowed down by using the drop-away time of a slow acting track repeater relay to measure the length of the respective impulses transmitted from each end of each of the track sections, although it is to be understood that other control means can be employed for measuring the length of the impulses transmitted. In this manner, a slower code may be transmitted normally than is practical to produce by a code oscillator, thus materially reducing the number of relay operations required and prolonging the life of the coding apparatus.

Another object of the present invention is to control the directional stick relays for the intermediate signals in a stretch of track between passing sidings in such a manner as to cause them to be picked up upon tumble-down of relays for the opposing signals, but to be dropped away in the rear of a train as it progresses through the stretch of track.

Another object of the present invention in connection with restoration to the normal conditions of self-coding for the track section in the rear of a train is to cause self-coding impulses to be first interspersed among opposing impulses formed by a 75 code oscillator, such 75 code impulses being transmitted in a direction to govern signals for a following train, and then cause self-coding impulses to be transmitted in both directions when the train progresses through the next block, the shift to both directions of self-coding being effected at a time to insure the continued transmission of self-coding impulses in both directions.

Another object of the present invention when self-coding impulses are interspersed among impulses repeated from a 75 code oscillator and transmitted in the opposite direction, is that the self-coding impulses be of such a length, together with a unique track circuit organization, as to effectively blank out alternate 75 code impulses of the oscillator forming impulses transmitted in the opposite direction, but not to shorten the other 75 code impulses which are actually transmitted.

Other objects, purposes and characteristic features of the present invention will be in part obvious from the accompanying drawings, and in part pointed out as the description of the invention progresses.

In describing the invention in detail, reference will be made to the accompanying drawings in which those parts having similar features and functions are designated through the several illustrations by like letter reference characters which are generally made distinctive by reason of preceding numerals indicative of the location of the signal with which such parts are associated and in which:

Figs. 1A, 1B and 1C when considered together illustrate means for communicating manually designated switch and signal controls from a control office to a plurality of field stations, together with circuit means at the field stations for receiving and storing the controls communicated from the control office;

Figs. 2A, 2B, 2C and 2D when placed end to end respectively illustrate the manner in which coded track circuits are applied to the control of the signals for this embodiment of the present invention;

Figs. 2D and 2A when placed end to end respectively illustrate the circuits involved in the transmission of track circuit codes through a siding section;

Fig. 3 illustrates in detail the manner in which approach locking relays are controlled for the signals at a typical field station of this embodiment of the present invention;

Fig. 4 illustrates the manner in which approach locking is applied in governing the power operation of a track switch to provide for its safe operation, together with the control of correspondence relays associated with that track switch;

Fig. 5 illustrates circuits typical of those employed for the control of code forming oscillators at each of the signal locations;

Figs. 6A through 6M (letter I omitted) illustrate diagrammatically the conditions of track circuit code transmission for the various track sections under certain typical conditions of train operation;

Figure 7:
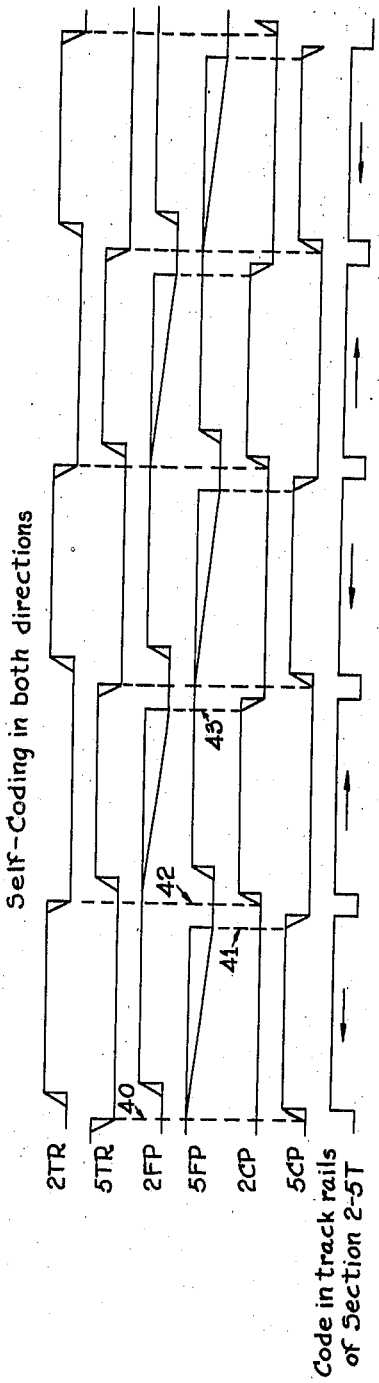
Figure 8:
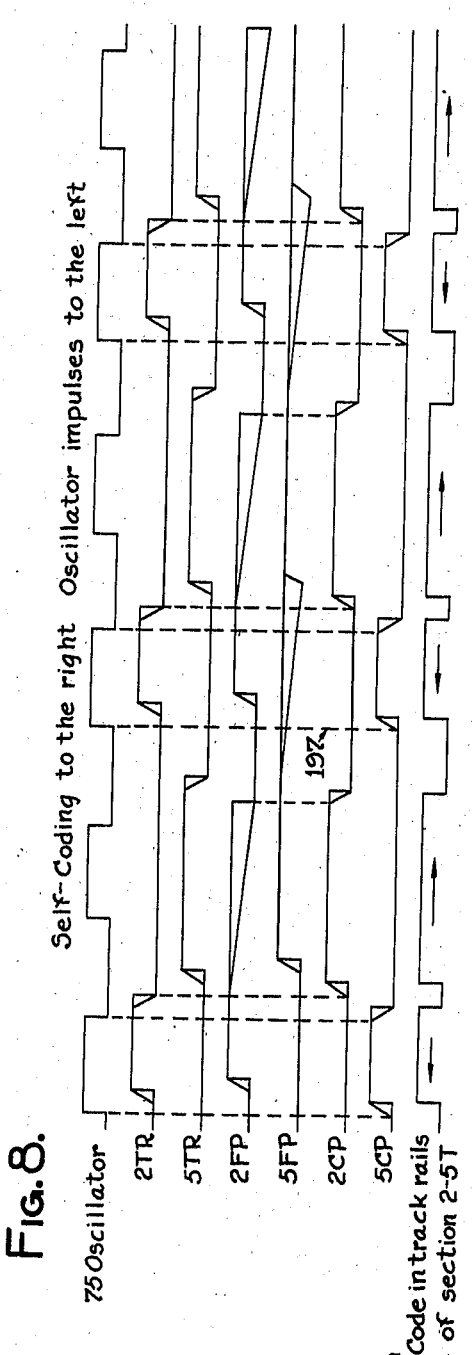

Fig. 7 illustrates diagrammatically how self-coding impulses are formed and transmitted under normal conditions of the system; and Fig. 8 illustrates diagrammatically how self-coding impulses are formed and transmitted alternately with code impulses formed by a 75 oscillator and transmitted from the opposite end of the track section as a step in the process of restoration to the normal conditions of self-coding in the rear of a train.

The illustrations employed in the disclosure of this embodiment of the present invention have been arranged to facilitate the disclosure as to the mode of operation and the principles involved rather than for the purpose of illustrating the construction and arrangement of parts that would be employed in practice. Thus the relays and their contacts are shown in a conventional manner, certain relay contacts being shown in written circuit form and identified as of particular relays by corresponding reference characters appearing directly above such contacts.

The symbols (+) and (−) are employed to indicate the positive and negative terminals respectively of suitable batteries or other sources of direct current, and the circuits with which those symbols are used always have current flowing in the same direction.

In order to simplify the description of the present invention, reference is made from time to time to functions common to all parts of a similar character by use in the description of letter reference characters without their preceding numerals for the designation of such parts. It is to be understood that such a reference applies to any parts designated in the drawings by reference characters that are similar except for numerals preceding the letters.

The trackway for which this embodiment of the present invention is provided comprises a main stretch of track divided into several track sections and having associated therewith passing sidings A and B (see Figs. 2A through 2D). The right-hand end of the passing siding A is connected to the main track by a track switch 2W, and the left-hand end of the passing siding B is connected to the main track by the track switch 3W. Associated with the track switches 2W and 3W are detector or OS track sections 2—3T and 8—9T respectively. Between the passing sidings A and B are track sections 2—5T, 4—7T and 6—9T, each of which has a coded track circuit. It is to be understood, and it will be readily apparent as the description progresses, that the number of track sections in the stretch of track between the passing sidings A and B can be increased or decreased in accordance with the requirements of practice. There is a track section in the portion of main track that is associated with each of the passing sidings which is conveniently called a siding section. Track section 8—11T, for example, is a siding section associated with the passing siding B.

Associated with the right-hand end of the passing siding A are manually controlled signals 2A, 2B, 3A and 3B, signals 2A and 2B being starting head-block signals governing entrance into the stretch of track between the passing sidings, and signals 3A and 3B being entering signals for governing train movements into the siding section and into the passing siding respectively. In a similar manner signals 8A, 8B, 9A and 9B are associated with the left-hand end of the passing siding B. Intermediate signals 4, 5, 6 and 7 are included in the stretch of track between the passing sidings A and B, signals 4 and 6 being provided for governing eastbound traffic (to the right) and signals 5 and 7 being provided for governing westbound traffic (to the left).

Although the signals illustrated in this embodiment of the present invention are of the type having individual color lamp units for the respective clear (green), caution (yellow), and danger or stop (red) indications, it is to be understood that other suitable signals such as semaphore signals, position light signals, or search light signals could as well be employed in accordance with the requirements of practice.

Each of the track sections in the stretch of track between the passing sidings A and B, and each of the siding sections has a coded track circuit which includes at each end a code following track relay TR and a source of current. For the purpose of obtaining the best operating characteristics of the code following track relays, and for the purpose of providing broken down joint protection, it is desirable that each of such relays have a polar structure so arranged as to cause the relay contacts to be biased to a deenergized position from which they can be moved only upon energization of the relay windings with a particular polarity.

Associated with each of the track relays TR is a code following track repeater relay TP which is used primarily to lighten the contact load of the track relay TR with which it is associated. Thus the contacts of each of the relays TP are used for governing the energization of a distant control relay D through the medium of a decoding transformer, the energization of a front contact repeater relay FP, the energization of a front and back contact repeater relay FBP, and the energization of a home control relay H. Of this group of relays, the relay D is responsive only to a 180 code rate, the relays FBP and H are sufficiently slow in dropping away to be maintained steadily picked up when a code of any nature is received by the associated track relay, and the relay FP is used to measure the length of the self-coding impulses which are transmitted under normal conditions of the system. The relay FP is quick is picking up but is sufficiently slow in dropping away to measure the desired length of the self-coding impulses. By this arrangement the slow drop-away characteristics of the FP relay will cause such relay to be maintained steadily picked up when a 180 or a 75 code is received by the associated track relay TR.

Suitable driven code forming devices are provided for the respective signal locations for forming the 180 and 75 code rates employed for the control of signals in established routes. Although it is to be understood that motor driven codes or other code forming devices could be employed, the driven codes are formed in this embodiment of the present invention by code oscillators which can be of a structure such as is shown, for example, in the application of O. S. Field, Ser. No. 369,862, dated December 12, 1940. An oscillator of such nature is capable of forming but one code, thus requiring separate oscillators for forming the 180 and 75 code rates respectively. It is therefore provided that 180 and 75 code oscillators 180C and 75C respectively are provided for each of the field stations and each of the intermediate signal locations. Such oscillators are normally inactive but their operation is initiated upon the establishment of a route including a signal at the location with which such oscillators is associated.

At each end of each of the coded track circuits is a code transmitter relay CP which is normally active in the transmission of impulses formed by self-coding means dependent upon the drop-away time of the relay FP for that end of the track circuit. Each relay CP is active for the transmission of self-coding impulses because of the energization of the H relay associated with that end of the track circuit, but upon the dropping away of that H relay, the relay CP becomes active for the transmission of a 75 or a 180 code as selected.

At each of the field stations, relays LGZ, RGZ, B, WN and WR (see Figs. 1B and 1C) are provided as relays subject to manual control from the control office. Of these relays, the relays LGZ and RGZ control the clearing of signals for governing westbound and eastbound traffic respectively, the relay B is employed in the manual restoration of a signal to stop, and the relays WN and WR are employed in governing the power operation of the track switch at that field station to respective normal and reverse positions.

Associated with the safe operation of the power track switch at each end of each of the passing sidings are approach locking relays AS, signal-at-stop relays M, a switch point repeater relay WP, and correspondence relays NCR and RCR as illustrated in Figs. 3 and 4. The correspondence relays NCR and RCR for each of the track switches have contacts included in the control circuits for the signal control relays AG and BG (see Fig. 2A) associated with the signals at that field station.

Each intermediate signal has a directional stick relay S employed in the control of signals for following train movements.

Having thus considered the general organization of the control apparatus employed in this embodiment of the present invention, a consideration will now be given to the mode of operation of the system under typical operating conditions.

Operation

*General.*—It is believed expedient before considering in detail the circuit organization of this embodiment of the present invention, to point out, with reference to the diagrams of Figs. 6A through 6M, the general mode of operation of the system and the objects accomplished thereby.

Figure 6A:
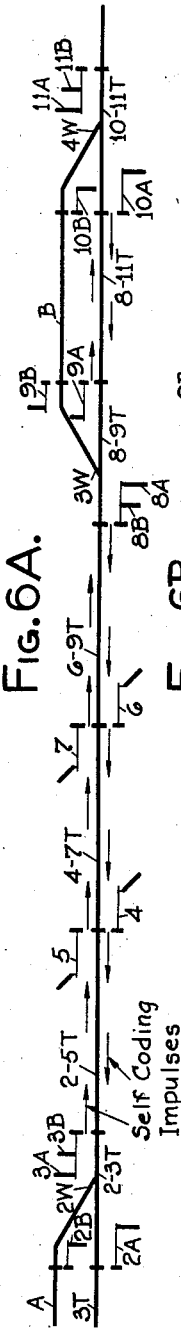

With reference to Fig. 6A the normal conditions of the system are illustrated. The normal conditions of the system are assumed to be those conditions which exist when the trackway is unoccupied, and when there are no routes established. Under such conditions the manually controlled signals at each of the field stations are at stop, the intermediate signals 4, 5, 6 and 7 are at caution, and the power track switches of the sidings are in their normal positions as would be required for the alignment of routes for through train movements on the main track.

Figure 6B:
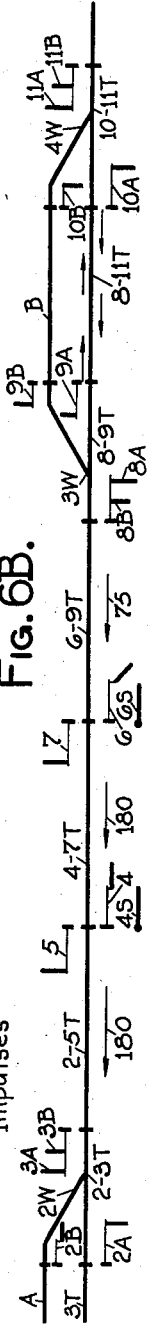
Figure 6C:
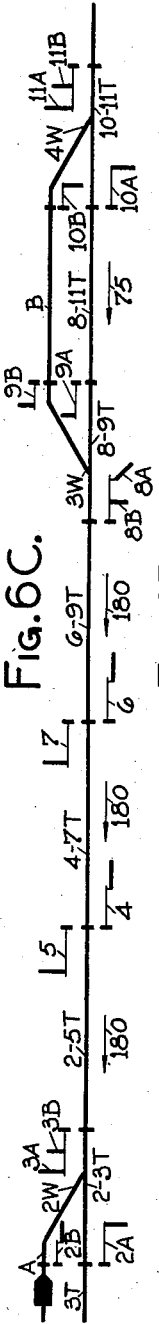

Normally, self-coding is effective in each of the coded track circuits as a potential means for interlocking the opposing manually controlled starting head-block signals governing entrance to the stretch of track between passing sidings, and the opposing manually controlled signals governing entrance to the siding section associated with each of the passing sidings. By this means, impulses of preferably a length substantially twice that of the length of a 75 code impulse are transmitted contemporaneously through each of the track sections having a coded track circuit, the impulses for both directions being transmitted in alternate relationship with each other. In this manner, it is provided that any one of the manually controlled signals can be controlled to indicate proceed, and upon the communication of such a control from the control office, an opposing signal interlock is set up by causing the tumble-down of the code transmitters supplying self-coding to the track circuits used in the control of opposing signals, such tumble-down being effective through each successive track section to the next opposing manually controlled signal. Upon the tumble-down becoming effective, as is illustrated in Fig. 6B where it is assumed that a control is transmitted for the clearing of signal 2B, a driven code is transmitted through each of the track sections through which the tumble-down has become effective to control the signals involved in the establishment of the route, such code being at a 75 or a 180 rate in accordance with the proceed or stop indication of the signal governing entrance to the adjacent track section. Thus in Fig. 6B a 75 driven code is transmitted from right to left in the track section 6—9T because of the signal 8A being at stop; a 180 driven code is transmitted from right to left in the track section 4—7T in accordance with the proceed indication of signal 6; and a 180 code is transmitted from right to left in the track section 2—5T because of the proceed indication of the signal 4. In accordance with the reception of the 180 driven code at the left-hand end of the track section 2—5T, the signal 2B is controlled to indicate clear after the track switch 2W has been properly power operated to its reverse position.

Figure 6D:
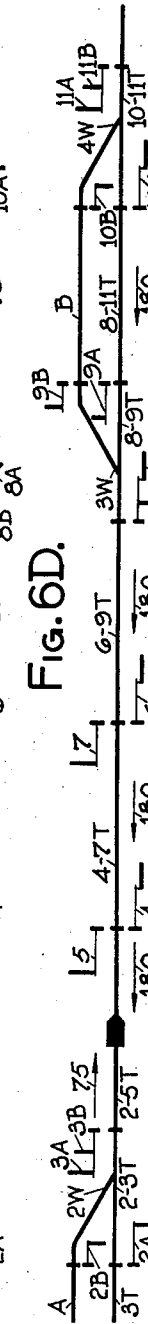

With reference to Fig. 6D, a condition is illustrated in which an operator is assumed to have proceeded further in the establishment of a route for an eastbound train by causing the signal 8A to indicate proceed. The communication of a control for the proceed indication of such signal from the control office is effective to cause the cessation of the transmission of self-coding impulses from left to right in the siding section 8—11T, such cessation providing an interlock to insure the maintaining of the opposing signal 11A at stop. The cessation of the self-coding causes the dropping away of the H relay at the right-hand end of that siding section, and the dropping away of such relay causes the transmission of a 75 driven code from right to left in the track section because of the stop indication of signal 10A, such 75 driven code being effective to cause the signal 8A to indicate caution.

The diagrams of Figs. 6D through 6G illustrate the conditions of restoration of the system of code transmission to normal in the rear of an eastbound train as it progresses along the trackway. It will be noted in Fig. 6E, that a step in restoration to the normal conditions of code transmission for the track section 2—5T in the rear of the eastbound train is a condition in which code impulses measured by the oscillator 75C are transmitted from right to left in the track section, while self-coding impulses of substantially greater length are interspersed alternately among the 75 code impulses. Under such conditions, only alternate 75 code impulses of the oscillator 75C at the right-hand end of the track section 2—5T are transmitted, as the other impulses are effectively blanked out by the self-coding impulses transmitted from the opposite end of the track section. This condition is diagrammatically illustrated in Fig. 8 and will be hereinafter considered more specifically in connection with the detailed description of the circuit organization.

Figure 6E:
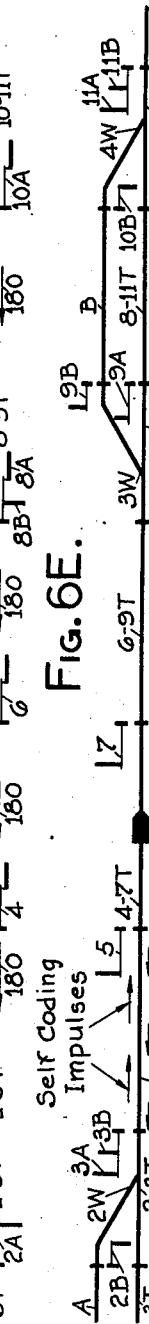
Figure 6F:
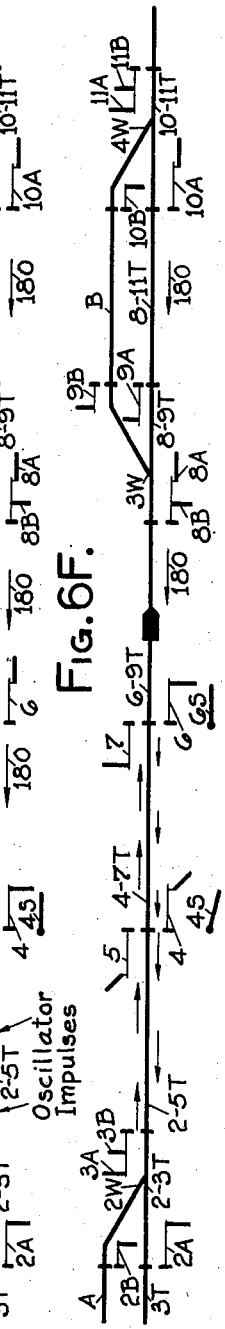

It will be noted in the diagram of Fig. 6F that as the eastbound train progresses so as to leave the track section 4—7T unoccupied in the rear of the train, the conditions of code transmission in such track section are established to correspond with those just described for the track section 2—5T, but the conditions of self-coding in the track section 2—5T are restored to normal so as to cause self-coding impulses to be transmitted in both directions. This change is effected in accordance with the dropping away of the stick relay 4S associated with signal 4, such relay being restored by the picking up of the H relay for the left-hand end of the track section 4—7T upon the reception of the code impulses transmitted from right to left in the track section 4—7T.

*Self-coding.*—In a coded track circuit system of the type under consideration, it is desirable to provide for transmission of current pulses at recurrent intervals in both directions over the track rails of the various track sections for detection of occupancy of such track sections by a train and for relaying a tumble-down control. In accordance with the present invention, this is accomplished by an operation conveniently termed "self-coding," as distinctive from the type of system, such as disclosed for example, in the prior application of T. J. Judge, Ser. No. 365,669, filed November 14, 1940 employing driven code pulses in one direction in conjunction with inverse or off-code pulses in the opposite direction, and also the type of system such as disclosed in the prior application of T. J. Judge, Ser. No. 455,922, filed August 24, 1942 employing driven codes of different rates for opposite directions to create a beat code condition. In the so-called self-coding organization of this invention, current pulses are transmitted alternately in opposite directions over the track rails of each track section, once such self-coding operation has been initiated, as a result of the intermittent energization of a code following track relay at each end of the track section by the current pulse received from the opposite end, and without the use of code oscillators or equivalent intermittently operated contacts for forming code pulses. The duration of these current impulses in opposite directions under such self-coding conditions is determined by the operating time of a suitable relay means governed by each track relay; and while the length or duration of these current pulses may be adapted to different operating conditions as desired by varying the operating time of such repeater relays, in the present embodiment it has been assumed that these pulses will be in the order of .8 of a second. In this connection, it should be understood that the release time of the code responsive or signal control relays, such as 2H in Fig. 2A, is sufficiently long to maintain its contacts closed by the operation of the associated track relay at recurrent intervals of such .8 of a second. The current pulse for each direction is transmitted when the current pulse for the opposite direction ceases after a brief interval corresponding with the release time of a quick-acting track relay and pick-up time of a quick-acting transmitter relay.

Fig. 7 shows diagrammatically in the form of a time chart the relative timing in the operation of the relays associated with the opposite ends of the track section 2—5T, together with the direction and duration of the current pulses in the track rails of this track section. In this explanatory diagram the vertical lines of the graphs for the several relays indicate a change between the open and closed condition of the contacts of the corresponding relay, the inclined lines associated with such vertical lines indicating the time involved for such operation of the contacts to occur after the circuit for the winding of the relay is opened and closed. The horizontal lines of the graphs in Fig. 7 indicate the time duration of an unchanged open or closed condition of the contacts of such relays, the elapse of time being from left to right.

Referring to the explanatory diagram of Fig. 7 and disregarding for the present how the so-called self-coding condition was created, assume that a current pulse transmitted from left to right over the track rails of track section 2—5T has just ceased, and the track relay 5TR has just become deenergized, as indicated at the left in Fig. 7. The repeater relays 5TP and 5FP are energized at the time the track relay 5TR releases and hence closing of a back contact of the track relay 5TR causes energization of the transmitter relay 5CP in the manner described in detail later and indicated by the dotted line 40 in Fig. 7, thereby connecting a track battery to the track rails of the track section 2—5T to transmit a current pulse in the opposite direction. When the track relay 5TR releases, it deenergizes its repeater relay 5TP (not included in the timing diagram in the interests of simplicity) and in turn the repeater relay 5FP which is made slow releasing by a rectifier, and after the slow-release time of relay 5FP the circuit for the transmitter relay 5CP is broken to terminate this current pulse as indicated by the dotted line 41 in Fig. 7. Thus, the deenergization of the track relay 5TR causes transmission of a current pulse of a limited duration toward the opposite end of the track section.

This current pulse thus created by the deenergization of track relay 5TR and energization of transmitter relay 5CP, causes energization of the track relay 2TR at the other end of the track section, and in turn its repeater relays 2TP and 2FP; and when this current pulse ceases, the track relay 2TR drops and causes energization of the transmitter relay 2CP to apply a current pulse at that end of the track section, as indicated by the dotted line 42 in Fig. 7. This current pulse from left to right continues until a repeater relay 2FP drops, whereupon the transmitter relay 2CP is deenergized as indicated by the dotted line 43 in Fig. 7.

This same operation just described is repeated over and over under the normal self-coding conditions under consideration, as the track relays for the opposite ends of the track section are automatically energized and then released by current pulses coming from the other end. It can be seen that these current pulses are self-generated, so to speak, with their duration and spacing determined by the characteristics of the track circuit and the operating times of the relays, as distinctive from the usual form of code transmission in coded track circuit systems where the duration and spacing of the code pulses are determined directly or indirectly by contacts intermittently operated by a motor driven coder or by a code oscillator at some fixed code rate, such as 75 or 180 times per minute, such coding contacts being ordinarily arranged to give substantially equal duration and spacing of code pulses.

The transmission of code pulses alternately in opposite directions by such a self-coding operation serves to maintain energized a suitable code responsive means at both ends of the track section such as the slow-release signal control relays 2H and 5H, and thus detect at both ends of the track section occupancy of that track section, and also afford a medium for relaying a tumble-down control in both directions for single track signaling. The self-coding condition above explained exists while the signal control relays 2H and 5H at both ends of the track section are energized; and when one or the other of these relays 2H or 5H is deenergized by stopping transmission of code pulses toward the corresponding end of the track section in a manner later explained, the code pulses transmitted from such end of the track section are changed to driven code pulses of a selected rate derived from a suitable code oscillator or the like. These driven code pulses of a selected code rate which exist when coding in the opposite direction is cut off, not only serve to govern the indication of signals without interference in accordance with the code rate but also act to initiate a restoration to the normal self-coding conditions after train movement and the like. In this connection, it can be seen that the self-coding condition above explained is due to the fact that the track relay at a given end of the track section, when energized by a current pulse from the opposite end, sends a code pulse toward such opposite end, thereby creating conditions at such opposite end to return another current pulse; and once this operation is initiated by the energization of the track relay at either end of the track section, such self-coding operation will continue until the transmission of code pulses toward either end of the track section is in some way cut off, and the track relay at that end is no longer energized.

Under certain conditions of train movement as later explained, driven code pulses at a caution code rate may be maintained for a time in one direction in a track section interspersed or separated by self-coding pulses from the opposite end. This condition is illustrated in the explanatory diagram of Fig. 8.

Having thus described in a general manner the mode of operation of the relays associated with the generation of self-coding impulses for a typical cycle of operation of self-coding, a more detail description will now be set forth as to the circuits involved in providing such mode of operation.

Assuming the relay 2TR (see Fig. 2A) to be dropped away at the termination of an impulse transmitted from right to left in the track section 2—5T, so that the dropping away of relay 2TR by the closure of back contact is effective to cause the picking up of the relay 2CP for initiating the transmission of a self-coding impulse from left to right in the track section, the relay 2CP is picked up by the energization of a circuit extending from (+), including front contact 44 of relay 2FP, back contact 45 of relay 2RGZ, front contact 46 of relay 2—3TR, front contact 47 of relay 2H, winding of relay 2CP, and back contact 48 of relay 2TR, to (—).

At the right-hand end of the track section 2—5T, the relay 5TR is picked up by the energization of a track circuit closed from the positive terminal of the track battery 49 including front contact 50 of relay 2CP, the lower rail of track section 2—5T, back contact 51 of relay 5CP (see Fig. 2B), winding of relay 5TR, and upper rail of track section 2—5T to the negative terminal of track battery 49. The picking up of relay 5TR closes an obvious circuit at front contact 52 to cause the picking up of the relay 5TP, and the picking up of such relay causes the picking up of relay 5FP by the closure of an obvious circuit at front contact 53. When relay 5FP is picked up, a circuit is closed for the relay 5H extending from (+), including front contact 54 of relay 5TP, front contact 55 of relay 5FP, front contact 56 of relay 5FBP, winding of relay 5H, and back contact 57 of relay 4S, to (—).

At the left-hand end of the track section 2—5T, the dropping away of the relay 2TR at the end of an impulse transmitted from right to left through the track section is effective to cause the dropping away of the repeater relay 2TP (see Fig. 2A) by the opening of front contact 48, and the opening of front contact 58 of relay 2TP deenergizes the relay 2FP, but, because of such relay having its winding shunted by a half-wave rectifier (or because of the relay having other means for making it slow in dropping away), the relay 2FP maintains its front contact in the circuit for relay 2CP closed for measuring the length of the impulse being transmitted from left to right in the track section 2—5T. The dropping away of the relay 2TP under such conditions opens the circuit for relay 2H, but such relay is sufficiently slow in dropping away to be maintained steadily picked up during the "off" periods of code transmission from right to left in the track section.

When the relay 2FP is dropped away after measuring the length of the impulse transmitted from left to right in the track section 2—5T, the opening of front contact 44 is effective to cause the dropping away of the relay 2CP for the termination of that impulse. The dropping away of the relay 5TR because of the opening of its circuit at front contact 50 of relay 2CP, causes the dropping away of the relay 5TP, and the dropping away of that relay causes the picking up of the relay 5CP for initiating the transmission of a self-coding impulse from right to left in the track section 2—5T. The circuit by which the relay 5CP is picked up under such conditions extends from (+), including front contact 59 of relay 4FBP, front contact 60 of relay 5FP, front contact 61 of relay 5H, winding of relay 5CP, back contact 62 of relay 5S, and back contact 52 of relay 5TR, to (—).

The dropping away of relay 5TR causes the dropping away of relay 5TP by opening front contact 52, and the dropping away of relay 5TP causes the deenergization of relay 5FP by opening front contact 53. The dropping away of relay 5TP is also effective to open the circuit which has been described for the relay 5H at front contact 54, but such relay is maintained picked up by its slow-acting characteristics, it being sufficiently slow to bridge the "off" periods of the code normally transmitted from left to right in the track section 2—5T. The closure of back contact of relay 5TP prior to the dropping away of the relay 5FP provides a circuit for the energization of the front-back repeater relay 5FBP, such circuit extending from (+), including back contact 53 of relay 5TP, front contact 63 of relay 5FP, and winding of relay 5FBP, to (—). The relay 5FBP has sufficiently slow drop-away characteristics to cause that relay to be maintained picked up during the "on" periods of the code normally transmitted from left to right in the track section 2—5T.

At the left-hand end of the track section 2—5T, the relay 2TR is responsive to the impulse initiated by the closure of front contact 51 of relay 5CP. The track circuit by which relay 2TR is energized extends from the positive terminal of track battery 64 including front contact 51 of relay 5CP, lower rail of track section 2—5T, back contact 50 of relay 2CP (see Fig. 2A), winding of relay 2TR, and upper rail of track section 2—5T to the negative terminal (see Fig. 2B) of track battery 64. In accordance with the picking of relay 2TR (see Fig. 2A), the closure of front contact 48 causes the picking up of relay 2TP, and the picking up of such relay causes the picking up of relay 2FP by the energization of an obvious circuit upon the closure of a front contact 58, the opening of back contact 58 being effective to open the circuit for the front-back repeater relay 2FBP, but such relay is sufficiently slow in dropping away to be maintained steadily picked up during the "on" periods of the code normally transmitted from right to left at the track section 2—5T. Upon the picking up of relay 2FP, a circuit is closed for the relay 2H extending from (+), including front contact 65 of relay 2TP, front contact 66 of relay 2FP, front contact 67 of relay 2FBP, and winding of relay 2H, to (—). Relay 2H is sufficiently slow in dropping away to be maintained steadily picked up during the "off" periods of the codes normally transmitted from right to left in the track section 2—5T.

At the right-hand end of the track section 2—5T (see Fig. 2B) the dropping away of the relay 5FP upon completing the timing of the self-coding impulse transmitted from right to left in the track section 2—5T, opens the circuit which has been described for the relay 5CP at front contact 60 to cause such relay to be dropped away and terminate the impulse by the opening of front contact 51 in the track circuit. The termination of the impulse causes the dropping away of the track relay 2TR (see Fig. 2A) at the left-hand end of track section, and the dropping away of such relay, by the closure of back contact 48, causes the picking up of relay 2CP for the transmission of the next impulse from left to right in the track section 2—5T, such relay being picked up by the energization of a circuit which has been described, for the initiation of a second cycle of operation corresponding to that which has just been considered in detail.

*Clearing of starting head-block signal.*—If, for example, an operator desires to cause the clearing of the starting head-block signal 2B for governing passage of a train out of the passing siding A into the main stretch of track between the passing sidings A and B, he actuates the switch control lever 2SML (see Fig. 1A) at the control office to its right-hand position for the power operation of the track switch 2W to its reverse position, and he also operates the signal control lever 2—3SGL to its right-hand position to cause the clearing of a signal at field station No. 1 governing traffic to the right. In accordance with the operation of lever 2SML to its right-hand position, a circuit is closed at contact 68 of such lever to apply energy to wire 24 for communication of a control to field station No. 1 for the picking up of the relay 2WR. In accordance with the communication of the control from the control office to field station No. 1 for the operation of the track switch 2W to its reverse position, energy is applied to wire 24 (see Fig. 1B) at such field station for the energization of a circuit for the relay 2WR including the upper winding of that relay, back contact 69 of relay 3LGZ, and back contact 70 of relay 2RGZ, to (—). Relay 2WR is maintained picked up by a stick circuit extending from (+), including back contact 182 of relay 2WN, front contact 183 of relay 2WR, and lower winding of relay 2WR, to (—).

The actuation of the lever 2—3SGL (see Fig. 1A) to its right-hand position applies energy upon the closure of contact 71 of such lever in its right-hand position to wire 23 for the communication of a control to field station No. 1 for the application of energy to wire 23 at such field station for the energization of the lower winding of relay 2RGZ. The circuit by which energy applied to wire 23 at field station No. 1 causes the energization of the lower winding of relay 2RGZ includes an interlocking back contact 72 of the relay 3LGZ for controlling opposing signals. A stick circuit for maintaining relay 2RGZ picked up is closed from (+), including front contact 184 of relay 2—3TR, connected in multiple with back contact 185 of relay 2—3TP, back contact 181 of relay 2—3B, front contact 186 of relay 2RGZ, and upper winding of relay 2RGZ, to (—).

Upon the picking up of relay 2RGZ, the circuit by which the relay 2CP (see Fig. 2A) has been active for the transmission of self-coding impulses is opened at back contact 45 to render such relay inactive. At the right-hand end of the track section 2—5T, the cessation of the pulsing of relay 5TR (see Fig. 2B) causes the cessation of the pulsing of relay 5TP by the opening of front contact 52, and the cessation of the pulsing of relay 5TP causes the cessation of the pulsing of relay 5FP because of the opening of its circuit at front contact 53. When relay 5FP is inactive the circuit for relay 5FBP is opened at front contact 63, and the dropping away of that relay opens the circuit at front contact 73 by which the relay 4CP has been normally active for the transmission of self-coding impulses from left to right in the track section 4—7T. The circuit by which relay 4CP has been active extends from (+), including front contact 73 of relay 5FBP, front contact 74 of relay 4FP, front contact 152 of relay 4H, winding of relay 4CP, back contact 76 of relay 4S, and back contact 77 of relay 4TR, to (—).

The dropping away of relay 5FBP under such conditions also closes a circuit to cause the picking up of the stick relay 4S associated with signal 4. Such circuit extends from (+), including front contact 78 of relay 4FBP, back contact 79 of relay 5FBP, back contact 80 of relay 5S, and winding of relay 4S, to (—).

At the right-hand end of the track section 4—7T, the cessation of code transmission from left to right in the track section causes the relays 7TR and 7TP (see Fig. 2C) to be rendered inactive, and the failure of relay 7TP to pulse contact 81 causes the cessation of the pulsing of the relay 7FP, and the inactivity of such relay upon opening front contact 82 causes the dropping away of relay 7FBP. Upon the dropping away of relay 7FBP, the opening of front contact 83 causes the relay 6CP to be rendered inactive for the transmission of self-coding impulses from left to right in the track section 6—9T. The relay 6CP has been active for the transmission of such impulses by the energization for each impulse of a circuit extending from (+), including front contact 83 of relay 7FBP, front contact 84 of relay 6FP, front contact 85 of relay 6H, winding of relay 6CP, back contact 86 of relay 6S, and back contact 87 of relay 6TR, to (—).

The dropping away of relay 7FBP also closes a circuit for the energization of the stick relay 6S associated with signal 6. Such circuit extends from (+), including front contact 88 of relay 6FBP, back contact 89 of relay 7FBP, back contact 90 of relay 7S, and winding of relay 6S, to (—).

The cessation of code transmission from left to right in the track section 6—9T renders the relays 9TR and 9TP (see Fig. 2D) inactive, and the cessation of the pulsing of contact 91 in the circuit of relay 9FP causes that relay to become inactive. The cessation of the pulsing of relay 9FP, upon the opening of front contact 92 causes the dropping away of relay 9FBP, and the relay 9H is also dropped away by the opening of its circuit which is normally closed during each impulse of a code received by the track relay 9TR, such circuit extending from (+), including front contact 93 of relay 9TP, front contact 94 of relay 9FP, front contact 95 of relay 9FBP, and winding of relay 9H, to (—). The dropping away of relay 9H upon the opening of front contacts 96 and 97 provides an opposing signal interlock to prevent the picking up of the relays 9AG and 9BG respectively if an operator were to attempt to cause the clearing of signal 9A or signal 9B.

The relay 5H (see Fig. 2B) at the right-hand end of the track section 2—5T is dropped away because of the termination of the pulsing of contact 54 of relay 5TP, such relay being normally energized during each impulse received by the track relay 5TR by a circuit which has been described. The dropping away of relay 5H opens a circuit which is normally closed for the yellow lamp of signal 5 at front contact 98. Such circuit is normally closed from (+), including front contact 98 of relay 5H, back contact 99 of relay 5D, and the yellow lamp Y of signal 5, to (—). The red lamp of signal 5 is illuminated by the energization of an obvious circuit closed at back contact 98 of relay 5H.

In accordance with the dropping away of the relay 5H, the relay 5CP is rendered active to transmit a driven code, such code being of a 180 or a 75 rate as selected by contact 100 of relay 4H. The circuit by which relay 5CP is active for the transmission of a 180 code, as selected by the closure of front contact 100 of relay 4H, extends from (+), including contact 101 of oscillator 180C, front contact 100 of relay 4H, back contact 61 of relay 5H, winding of relay 5CP, back contact 62 of relay 5S, and back contact 52 of relay 5TR, to (—).

In a similar manner, at the right-hand end of track section 4—7T, the relay 7H (see Fig. 2C) is dropped away when relay 7TP is rendered inactive, such relay 7H being normally energized for each impulse of the code received by relay 7TR because of the closure of a circuit extending from (+), including front contact 102 of relay 7TP, front contact 103 of relay 7FP, front contact 104 of relay 7FBP, winding of relay 7H, and back contact 105 of relay 6S, to (—). The dropping away of relay 7H opens a circuit which is normally closed for the yellow lamp of signal 7 at front contact 106. Such circuit is normally closed from (+), including front contact 106 of relay 7H, back contact 107 of relay 7D, and the yellow lamp of signal 7, to (—). The red lamp of signal 7 is illuminated by the energization of an obvious circuit closed at back contact 106 of relay 7H. The closure of back contact 108 of relay 7H establishes a circuit by which the relay 7CP becomes active for the transmission of a 180 code as selected by the closure of front contact 109 of relay 6H, such circuit extends from (+), including contact 110 of oscillator 180C, front contact 109 of relay 6H, back contact 108 of relay 7H, winding of relay 7CP, back contact 111 of relay 7S, and back contact 112 of relay 7TR, to (—).

The dropping away of the relay 9H (see Fig. 2D) at the right-hand end of the track section 6—9T is effective to render the relay 9CP active for the transmission of a 75 code from right to left in the track section 6—9T. The circuit by which relay 9CP is active under such conditions extends from (+), including contact 113 of oscillator 75C, back contact 114 of relay 8AG, front contact 115 of relay 8—9TR, back contact 116 of relay 9H, winding of relay 9CP, and back contact 117 of relay 9TR, to (—).

It will be seen from the mode of operation and the circuit organization which has been described, that the tumble-down through each of the respective track sections renders the code transmitter relay CP active for the transmission of a driven code from right to left in that track section, rather than causing the transmission of driven codes in the respective track sections to be rendered active only after the tumble-down has been completed through the stretch. By this circuit organization it is provided that the H relays are maintained picked up associated with the signals to govern passage of a train over the route being established. For example, in the condition of operation under consideration the relays 2H, 4H and 6H are maintained picked up during the time when the tumble-down is taking place, there being a minimum interruption in the shifting from the transmission of self-coding impulses from right to left in the track sections involved to the transmission of 180 or 75 driven code impulses.

After the track switch 2W has been power operated to its reverse position in accordance with the closure of a reverse operating switch control circuit for the switch machine 2SM at front contact 118 of relay 2WR as illustrated in Fig. 4, the reverse correspondence relay 2RCR is picked up by the energization of a circuit extending from (+), including front contact 119 of relay 2WR, back contact 120 of relay 2WN, winding of relay 2RCR, polar contact 121 of relay 2WP in its left-hand position, and front contact 122 of relay 2WP, to (−).

In accordance with the picking up of relay 2RCR, a circuit is closed for the energization of the signal control relay 2BG (see Fig. 2A) extending from (+), including front contact 123 of relay 2—3TR, back contact 124 of relay 2NCR, front contact 125 of relay 2RCR, front contact 126 of relay 2H, front contact 127 of relay 2RGZ, and winding of relay 2BG, to (−). The picking up of relay 2BG opens the circuit by which the red lamp of signal 2B has been energized at back contact 128, and the closure of front contact 128 of relay 2BG establishes a circuit by which the green lamp G of signal 2B is energized, such circuit extending from (+), including front contact 128 of relay 2BG, front contact 129 of relay 2D, and lamp G of signal 2B, to (−). The relay 2D is picked up under such conditions because of the 180 driven code transmitted from right to left in the track section 2—5T. Such relay is energized only responsive to such code by the pulsing of contact 130 of relay 2TP, through the medium of transformer 131 and a tuned circuit including condenser 132 and transformer 133. A full-wave rectifier 134 is included in the circuit between relay 2D and the transformer in a manner usually employed in tuned circuits used in signaling systems.

*Clearing of entering signal.*—For the purpose of describing specifically a typical mode of operation in connection with the clearing of an entering signal, it will be assumed that an operator desires to cause the clearing of signal 8A for governing the passage of a train through the siding section 8—11T associated with the passing siding B. Under such conditions he actuates the switch control lever 3SML (see Fig. 1A) at the control office to its left-hand position for controlling the operation of the track switch 3W at field station No. 2 to its normal position. It is assumed, however, that such track switch is in its normal position in correspondence with the illustration in Fig. 1C of the normally energized condition of the relay 3WN used in causing the power operation of the track switch 3W to its normal position. Such relay 3WN is picked up in accordance with the application of energy at the control office to wire 25 with contact 135 of lever 3SML (see Fig. 1A) in its left-hand position. The relay 3WN is maintained picked up by a local stick circuit (see Fig. 1C) extending from (+), including back contact 136 of relay 3WR, front contact 137 of relay 3WN, and lower winding of relay 3WN, to (−).

To cause the clearing of signal 8A (such signal being selected in preference to signal 8B by the normal position of the track switch 3W) the operator actuates the signal control lever 8—9SGL (see Fig. 1A) to its right-hand position, and in accordance with such operation energy is applied at contact 138 of such lever to wire 27 for the communication of a signal control to field station No. 2. At field station No. 2 (see Fig. 1C), the reception of such control is effective to apply energy to wire 27 and cause the picking up of the relay 8RGZ. Such relay is picked up, and maintained energized by a stick circuit, in a manner corresponding to that which has been described for the relay 2RGZ of field station No. 1 when considering the clearing of a starting head-block signal.

To consider the conditions of code transmission in the siding section of the main track associated with the passing siding B, Fig. 2A will be considered as being placed to the right of Fig. 2D, as the circuits of Fig. 2A correspond with those provided but not shown for the right-hand end of the passing siding B.

The picking up of relay 8RGZ, with the reverse switch control relay 3WR dropped away, opens a circuit by which the relay 8CP has been normally active for the transmission of self-coding impulses in the siding section 8—11T. The circuit by which the relay 8CP has been active extends from (+), including front contact 139 of relay 8FP, back contact 140 of relay 8RGZ, front contact 141 of relay 8—9TR, front contact 142 of relay 8H, winding of relay 8CP, and back contact 143 of relay 8TR, to (−). The cessation of the pulsing of contact 144 of relay 8CP causes the track relay at the right-hand end of the track section corresponding to relay 3TR of Fig. 2A to become inactive. In accordance with the cessation of the pulsing of relay 3TR, the failure of relay 3TP to close front contact 145 causes the relay 3FP to become inactive, and the inactivity of such relay causes the dropping away of relay 3FBP by the opening of front contact 146. The relay 3H is dropped away upon the cessation of the pulsing of contact 147 of relay 3TP, such relay being normally energized for each self-coding impulse received by the relay 3TR upon the closure of a circuit extending from (+), including front contact 147 of relay 3TP, front contact 148 of relay 3FP, front contact 149 of relay 3FBP, winding of relay 3H, and front contact 150 of relay 2—3TR, to (−).

Upon the dropping away of relay 3H, the relay 3CP is rendered inactive for the transmission of self-coding impulses, but is rendered active for the transmission of a 75 code by its energization for each impulse of the oscillator 75C at that location by a circuit extending from (+), including contact 151 of oscillator 75C, back contact 153 of relay 2AG, front contact 154 of relay 2—3TR, back contact 155 of relay 3H, winding of relay 3CP, and back contact 156 of relay 3TR, to (−).

At the left-hand end of the siding section, the relay 8TR follows the 75 code applied at the right-hand end of that track section, and the pulsing of contacts 157 and 158 of relay 8TP at that rate maintains the relays 8FP, 8FBP and 8H steadily picked up. The relay 8FP is energized during the "on" periods of the code; the relay 8FBP is energized during the "off" periods of the code in accordance with the closure of front contact 159 of relay 8FP; and the relay 8H is energized during each impulse of the code received by a circuit extending from (+), including front contact 158 of relay 8TP, front contact 160 of relay 8FP, front contact 161 of relay 8FBP, winding of relay 8H, and front contact 162 of relay 8—9TR, to (—).

With the relay 8H picked up, the correspondence relay 3NCR for the track switch 3W in its energized position, and the office controlled relay 8RGZ picked up, a circuit is closed for the energization of the signal control relay 8AG extending from (+), including front contact 163 of relay 8—9TR, front contact 164 of relay 3NCR, back contact 165 of relay 3RCR, front contact 166 of relay 8H, front contact 167 of relay 8RGZ, and winding of relay 8AG, to (—). The picking up of relay 8AG causes the extinguishing of the red lamp R of signal 8A by the opening of back contact 168, and the closure of front contact 168 causes the energization of the yellow lamp Y of such signal by a circuit extending from (+), including front contact 168 of relay 8AG, back contact 169 of relay 8D, and the yellow lamp Y of signal 8A, to (—). This completes the mode of operation effective for causing the display of a proceed indication by an entering signal in accordance with the positioning of the corresponding signal control lever at the control office.

If an operator proceeds further in the alinement of a route for an eastbound train so as to cause the clearing of the head-block starting signal 10A (see Fig. 6D), the clearing of such signal is effective to cause a 180 driven code to be transmitted through the siding section 8—11T for the control of signal 8A for causing the energization of the green lamp of such signal The clearing of the starting head-block 10A is effected in a manner corresponding to that which has been described for the clearing of the signal 2B, except that the power switch 4W at the right-hand end of the passing siding is operated to its normal position in accordance with the route desired to be established, such position being effective to select the signal 10A to be cleared in preference to the signal 10B.

Considering again Fig. 2A being placed to the right of Fig. 2D, the clearing of the signal 10A (see Fig. 6D) at the right-hand end of the passing siding B is effected in accordance with the energization of a signal control relay corresponding to relay 2AG of Fig. 2A. The energization of relay 2AG under such conditions would cause the relay 3CP to become active for the transmission of a 180 driven code by the energization of such relay for each impulse of the oscillator 180C upon the closure of a circuit extending from (+), including contact 170 of oscillator 180C, front contact 153 of relay 2AG, front contact 154 of relay 2—3TR, back contact 155 of relay 3H, winding of relay 3CP, and back contact 156 of relay 3TR, to (—).

The reception of the 180 code at the left-hand end of the track section causes the pulsing of contact 171 of relay 8TP at a 180 rate, and the pulsing of that contact is effective through the medium of the decoding transformer 172 in combination with a tuned circuit to cause the picking up of the relay 8D. The picking up of such relay is effective to cause the extinguishing of the yellow lamp of signal 8A by the opening of back contact 169, and to cause the energization of the green lamp G of signal 8A in an obvious manner.

*Approach locking.*—It is to be understood that various forms of locking can be used with the present invention in accordance with the requirements of practice, such locking being provided as straight time locking or as approach locking with various forms of restoration for the approach locking relays AS upon passage of a train.

The approach locking illustrated in Fig. 3 for this embodiment of the present invention corresponds to that shown and described in the above mentioned prior application of Judge, Ser. No. 455,922, filed August 24, 1942, in that contacts of the H relays are used in providing the approach release for the locking.

As a typical condition of the manner in which approach locking is provided, consideration will be given more specifically to the relay 2AS associated with the signals 2A and 2B at the right-hand end of the passing siding A. Such relay is normally energized by its stick circuit closed from (+), including front contact 173 of relay 2M, winding of thermal relay 2TH, front contact 174 of relay 2AS, and winding of relay 2AS, to (—). Upon the clearing of either signal 2A or signal 2B, the picking up of the corresponding signal control relay 2AG or 2BG is effective in an obvious manner to cause the dropping away of the relay 2M, and the dropping away of such relay is effective to open the stick circuit for the relay 2AS at front contact 173 to cause such relay to be dropped away. Upon the dropping away of the relay 2AS, the opening of contacts 175 and 176 of such relay in the operating circuit for the switch machine 2SM (see Fig. 4) is effective to prevent the unsafe operation of the track switch 2W. When a train accepts either of the signals, such signal is restored to stop in a manner to be hereinafter described, and the restoration of the signal to stop closes a circuit for the relay 2M (see Fig. 3) such circuit extending from (+), including back contact 177 of relay 2BG, back contact 178 of relay 2AG, and winding of relay 2M, to (—). The closure of front contact 173 of relay 2M, with the detector track section 2—3T occupied by the train, causes the picking up of the relay 2AS by the energization of a circuit extending from (+), including front contact 173 of relay 2M, back contact 179 of relay 2—3TR, and winding of relay 2AS, to (—).

If for some reason an operator desires to restore signal 2A or signal 2B to its stop position manually by the transmission of a stop code from the control office for such signal, he causes the transmission of a control to cause the picking up of the stop control relay 2—3B (see Fig. 1B), and the picking up of such relay, by opening back contact 181 in the stick circuit of relay 2RGZ, is effective to cause the restoration to stop of whichever of the two signals has been cleared.

The picking up of the stop repeater relay 2M (see Fig. 3) under such conditions can cause the picking up of the relay 2AS immediately by an approach release circuit, if the relay 3H is picked up, and if the track switch 2W is in its normal position, such circuit extends from (+), including front contact 173 of relay 2M, front contact 187 of relay 3H, front contact 188 of relay 2NCR, and winding of relay 2AS, to (—). If this circuit cannot be closed, the relay 2AS can be picked up only after a predetermined time interval measured by the thermal relay 2TH. The heating coil of the thermal relay is energized under such conditions by a circuit extending from (+), including front contact 173 of relay 2M, winding of thermal relay 2TH, and back contact 174 of relay 2AS, to (—). Upon the closure of the contact 189 of the thermal relay 2TH in its heated position, the relay 2AS can be picked up by the energization of a circuit extending from (+), including front contact 173 of relay 2M, contact 189 of thermal relay 2TH in its heated position, and winding of relay 2AS, to (—). The picking up of such relay upon the closure of front contact 174 establishes a stick circuit which has been described to maintain that relay picked up during normal conditions of the system.

It will be noted from the typical conditions which have been described, that the establishment of a route through the siding section 3T in approach to the signal 2A, by the dropping away of the relay 3H is effective to approach lock the track switch 2W so that the predetermined time measured by the thermal relay 2TH is required upon the attempt of an operator to restore the signal 2A to stop and change the position of the track switch 2W.

*Passage of a train.*—Assuming a route to be established in a manner which has been described for the passage of an eastbound train into the stretch of track between the passing sidings A and B from the passing siding A, the conditions of operation will be considered that are involved in the passage of the eastbound train over such route.

Upon the accepting of signal 2B by the eastbound train, the entrance of the train into the detector track section 2—3T causes the dropping away of the track relay 2—3TR, and the dropping away of such relay (see Fig. 1B) prior to the dropping away of the repeater relay 2—3TP momentarily opens the stick circuit for the relay 2RGZ at front contact 184 to cause such relay to be dropped away. The dropping away of the relay 2RGZ, however, cannot be effective to render the code transmitter relay 2CP (see Fig. 2A) active for the transmission of a code from left to right in the track section 2—5T, as the circuit for relay 2CP is open at front contact 46 of the relay 2—3TR for the detector track section 2—3T. The dropping away of the relay 2RGZ, however, by opening front contact 127 causes the dropping away of the relay 2BG, and the dropping away of such relay by the shifting of contact 128 causes the extinguishing of the green lamp of signal 2B and the energization of the red lamp of such signal.

When the eastbound train progresses further so as to occupy the track section 2—5T after the detector track section 2—3T has become unoccupied in the rear of the train, the picking up of the relay 2—3TR is effective to render the code transmitter relay 2CP active for the transmission of a 75 code from left to right in the track section 2—5T in the rear of the train as indicated in the diagram of Fig. 6D. The circuit by which the relay 2CP is energized for each impulse of such code extends from (+), including contact 190 of oscillator 75C, back contact 191 of relay 3AG, front contact 192 of relay 2—3TR, back contact 47 of relay 2H, winding of relay 2CP, and back contact 48 of relay 2TR, to (—).

The intermediate signal 4 (see Fig. 2B) is clear for governing the passage of the eastbound train in accordance with the transmission of a 180 code from right to left in the track section 4—7T in a manner which has been described. The green lamp of such signal is illuminated in accordance with the energization of a circuit extending from (+), including front contact 193 of relay 4H, front contact 194 of relay 4D, and the green lamp G of signal 4, to (—).

When the train progresses further along the trackway so as to occupy the track section 4—7T and leave the track section 2—5T unoccupied in the rear of the train as illustrated in Fig. 6E, conditions of code transmission in the track section 2—5T become effective so as to transmit self-coding impulses from left to right in the track section and impulses repeated from a 75 oscillator from right to left interspersed alternately among the self-coding impulses. The signal 4 is put to stop in an obvious manner upon the shunting of the track section 4—7T by the shifting of contact 193 of relay 4H.

Upon the dropping away of relay 4H, due to the shunting of the track section 4—7T by the train, the relay 5CP becomes active for the transmission of a 75 code by the energization of a circuit extending from (+), including contact 195 of oscillator 75C, front contact 196 of relay 4S, back contact 100 of relay 4H, back contact 61 of relay 5H, winding of relay 5CP, back contact 62 of relay 5S, and back contact 52 of relay 5TR, to (—). It will be noted that the relay 5H is deenergized at this time because of its circuit being open at back contact 57 of relay 4S.

The reception at the left-hand end of the track section 2—5T of a 75 code impulse causes the picking up respectively of the relays 2TR, 2TP and 2FR (see Fig. 2A), but the relay 2H is not picked up until the reception of the second impulse. During the "off" period following the first impulse transmitted, the relay 2FBP is picked up by the energization of an obvious circuit, and the picking up of such relay conditions the circuit for relay 2H so that such relay will be picked up upon the reception of the second impulse. In accordance with the picking up of the relay 2H during the second impulse received at the left-hand end of the track section 2—5T, the relay 2CP is conditioned for the transmission of a self-coding impulse, such relay being picked up upon the closure of back contact 48 of the track relay 2TR at the termination of the 75 code impulse transmitted from right to left in the track section, such circuit corresponding to that which has been described as being effective for the transmission of self-coding impulses under the normal conditions of the system.

The reception of the right-hand end of the track section 2—5T of a self-coding impulse under such conditions causes the picking up of relays 5TR, 5TP and 5FP (see Fig. 2B) respectively, and the picking up of the relay 5TR, by opening back contact 52 in the circuit for relay 5CP, is effective to cause the relay 5CP to be rendered inactive until the termination of the relatively long self-coding impulse.

With reference to the diagrams of Fig. 8, it will be noted that the self-coding impulse being timed by the slow drop-away characteristics of the relay 2FP is of sufficient length to effectively blank out the second impulse illustrated of the 75 code oscillator at the right-hand end of the track section. This is done, as has been pointed out, by the inclusion of back contact 52 of the relay 5TR (see Fig. 2B) in the circuit for relay 5CP to render the relay 5CP non-responsive to such second impulse. It will be noted with reference to Fig. 8 that the termination of the first of the self-coding impulses transmitted is during an "off" period of the 75 oscillator at the right-hand end of the track section 2—5T, and therefore there is a short "off" period in the transmission of codes in the track section 2—5T preceding the transmission of the next impulse from right to left in that track section. Such impulse is of a length measured by the 75 oscillator, the relay 5CP being picked up at the beginning of the third 75 pulse of the oscillator 75C as indicated by the dotted line 197. The picking up of the relay 5CP, by the closure of front contact 51 (see Fig. 2B) in the track circuit for track section 2—5T, causes the transmission of a 75 code impulse which, upon being received at the left-hand end of the track section 2—5T, is effective to initiate a cycle of operation corresponding to that which has been described by which a self-coding impulse is caused to be transmitted upon the termination of that 75 code impulse.

In this manner it will be readily apparent that when the track section 4—7T is occupied by an eastbound train, and the track section 2—5T has become unoccupied in the rear of the train, self-coding impulses and impulses measured by a 75 oscillator are alternately transmitted in opposite directions through the track section 2—5T as diagrammatically illustrated in Fig. 8, the impulses being transmitted in such a manner as not to allow the transmitters for the respective ends of the track section to fore-shorten the impulses transmitted from the opposite end of the track section. It will be noted that under such conditions the relay 5CP is active for the transmission of impulses formed by a 75 oscillator rather than self-coding impulses because the relay 5H is maintained dropped away, its pick-up circuit being dependent upon the restoration of the stick relay 4S. Such stick relay is maintained picked up when the track section 4—7T is occupied by an eastbound train by the energization of its stick circuit extending from (+), including back contact 198 of relay 4FBP, front contact 199 of relay 4S, and winding of relay 4S, to (—). The relay 4S has sufficiently slow drop-away characteristics to insure that it will be maintained picked up during the shifting of the contacts of relay 4FBP upon the opening of the pick-up circuit for such relay and the closing of its stick circuit at contacts 78 and 198 respectively.

To consider further progress of the train, it will be assumed that it accepts the signal 6 which has been cleared in a manner corresponding to that which has been described for the intermediate signal 4, and proceeds to a point where the track section 4—7T becomes unoccupied in the rear of the train as illustrated in Fig. 6F.

Under such conditions, the conditions of code transmission in the track section 4—7T are established to correspond to those conditions which have been described in detail for the track section 2—5T, such conditions involving the transmission of self-coding impulses from left to right in the track section with impulses measured by a 75 oscillator at the right-hand end of the track section being transmitted in the opposite direction and interspersed alternately among the self-coding impulses.

When the track section 4—7T first becomes unoccupied in the rear of the train, the transmission of a first 75 code impulse from right to left causes the picking up of relays 4TR, 4TP and 4FP (see Fig. 2B) respectively at the left-hand end of the track section, and during the following "off" period the relay 4FBP is picked up. The picking up of such relay opens the stick circuit for relay 4S at back contact 198 and causes such relay to be dropped away, as the pick-up circuit for relay 4S is open at back contact 79 of relay 5FBP. Upon the dropping away of the relay 4S, the circuit which has been described for the relay 5H is closed at back contact 57 to provide that such relay is picked up. In accordance with the picking up of the relay 5H, the shifting of contact 61 in the circuit for relay 5CP opens the circuit by which the relay 5CP has been active for the transmission of impulses measured by a 75 oscillator, and closes a circuit, which has been described when considering the normal conditions of code transmission in the track section 2—5T, by which the relay 5CP becomes active for the transmission of self-coding impulses. It will be noted that the nature of the self-coding is such as to be dependent upon the reception of a code impulse for rendering the transmission of a code impulse in the opposite direction in the track section effective. Thus it is desirable, in order to insure the continued transmission of self-coding impulses in the track section 2—5T, that the relay 5CP be shifted to the control for self-coding impulse transmission at a time when the relay 5FP is picked up in order to insure that a circuit will be closed at front contact 60 of relay 5FP for the transmission of the first self-coding impulse from right to left by the relay 5CP. This condition is insured by the use of contact 61 of relay 5H in the shifting of the control circuit of relay 5CP to the self-coding circuit, as the relay 5H, under such conditions, would be picked up upon the reception of a self-coding impulse by the relay 5TR, the relay 5FP also being responsive to such impulse and thus being picked up at the time when the shift in the circuits for the relay 5CP is rendered effective.

To consider further progress of an eastbound train, it will be assumed that the train accepts the entering signal 8A, such signal having been cleared in a manner which has been described. Upon the acceptance of such signal, the dropping away of the track relay 8—9TR for the detector track section 8—9T causes the dropping away of the office controlled relay 8RGZ by opening the stick circuit for such relay at front contact 200 prior to the closure of back contact 201 of relay 8—9TP (see Fig. 1C). The dropping away of the track relay 8—9TR also causes the dropping away of the signal control relay 8AG (see Fig. 2D) by the opening of front contact 163, and thereby causes the extinguishing of the green lamp G of signal 8A and the energization of the red lamp R of such signal upon the shifting of contact 168 of relay 8AG. The dropping away of the office control relay 8RGZ by opening front contact 167 in the circuit for relay 8AG provides that signal 8A will be maintained at stop after the detector track section 8—9T has become unoccupied in the rear of the train.

The dropping away of the track relay 8—9TR is also effective to render the code transmitter relay 9CP inactive by opening its circuit at front contact 115.

Inasmuch as the relay 6CP at the left-hand end of the track section 6—9T cannot transmit until a code has been transmitted from right to left in the track section 6—9T to cause the dropping away of the stick relay 6S, there is no code transmitted in either direction in the track section 6—9T until after the detector track section 8—9T has become unoccupied in the rear of the eastbound train.

When the eastbound train progresses to a point as illustrated in Fig. 6G so as to cause the track section 8—9T to be unoccupied in the rear of the train, the picking up of the relay 8—9TR is effective to close a circuit for rendering the relay 9CP active for the transmission of a 75 code from right to left in the track section 6—9T. Such circuit extends from (+), including contact 113 of oscillator 75C, back contact 114 of relay 8AG, front contact 115 of relay 8—9TR, back contact 116 of relay 9H, winding of relay 9CP, and back contact 117 of relay 9TR, to (—).

The reception at the left-hand end of the track section 6—9T of the first impulse of such 75 code causes the picking up respectively of relays 6TR, 6TP and 6FP (see Fig. 2C), and the relay 6FBP is picked up at the termination of the first impulse. The picking up of relay 6FBP, by opening back contact 202, causes the dropping away of the stick relay 6S, and the dropping away of such relay, by the closure of back contact 105 establishes a circuit by which the relay 7H is picked up upon the reception of an impulse at the right-hand end of the track section 4—7T. The picking up of such relay restores the normal conditions of self-coding in section 4—7T in a manner which has been specifically described for restoration to normal in the track section 6—9T.

Upon the reception of the second impulse of the 75 code transmitted from right to left in the track section 6—9T, the relay 6H is picked up by the energization of a circuit extending from (+), including front contact 203 of relay 6TP, front contact 204 of relay 6FP, front contact 205 of relay 6FBP, winding of relay 6H, and back contact 206 of relay 7S, to (—). The picking up of such relay, upon the closure of front contact 85, is effective to render the relay 6CP active for the transmission of self-coding impulses in the track section 6—9T by the energization of a circuit extending from (+), including front contact 83 of relay 7FBP, front contact 84 of relay 6FP, front contact 85 of relay 6H, winding of relay 6CP, back contact 86 of relay 6S, and back contact 87 of relay 6TR, to (—).

When the first self-coding impulse is received at the right-hand end of the track section 6—9T, the relays 9TR, 9TP and 9TF (see Fig. 2D) respond respectively to that impulse, and the relay 9FBP is picked up upon the termination of such impulse. Upon the dropping away of the relay 9TR at the end of the first self-coding impulse, the closure of back contact 117 of such relay in the circuit for the relay 9CP renders such relay active for the transmission of another impulse formed by the oscillator 75C. The reception of such impulse at the left-hand end of the track section 6—9T is effective to cause the transmission of a second self-coding impulse from left to right in the track section 6—9T, and the reception of such impulse at the right-hand end of that track section is effective to cause the picking up of the relay 9H by the energization of a circuit extending from (+), including front contact 93 of relay 9TP, front contact 94 of relay 9FP, front contact 95 of relay 9FBP, and winding of relay 9H, to (—). Upon the picking up of relay 9H at that time, the shifting of contact 116 in the circuit for the relay 9CP is effective to condition such relay for the transmission of the first self-coding impulse from right to left in the track section 6—9T. The relay 9CP is picked up subsequent to the dropping away of the track relay 9TR at the end of the impulse used in picking up the relay 9H by the energization of a circuit extending from (+), including front contact 207 of relay 9FP, back contact 208 of relay 9LGZ, front contact 209 of relay 8—9TR, front contact 116 of relay 9H, winding of relay 9CP, and back contact 117 of relay 9TR, to (—). Thus, the conditions of self-coding are restored for the track section 6—9T, such restoration being effective to complete the restoration to normal conditions of code transmission for the various track sections in the stretch of track between the passing sidings A and B.

To consider the mode of operation of the system upon restoration to normal conditions in the rear of a train for a siding section, the Fig. 2A will be considered as placed at the right of Fig. 2D, the circuits of such figure corresponding to those provided for the right-hand end of the passing siding B.

When a train occupies the siding section 8—11T, after the detector track section 8—9TR has become unoccupied in the rear of the train, the relay 8CP becomes active for the transmission of a 75 code in the rear of the train by the energization for each pulse of the oscillator 75C of a circuit extending from (+), including contact 210 of oscillator 75C, back contact 211 of relay 9AG, front contact 212 of relay 8—9TR, back contact 142 of relay 8H, winding of relay 8CP, and back contact 143 of relay 8TR, to (—).

When the siding section becomes unoccupied by the eastbound train, the reception of a first impulse of the 75 code transmitted from left to right in the siding section causes the energization of relays corresponding to relays 3TR, 3TP and 3FP respectively (see Fig. 2A), and during the "off" period following such impulse, the relay 3FBP is picked up. The picking up of relay 3FBP conditions the circuit for relay 3H so that such relay can be picked up during an impulse after the detector track section at the right-hand end of the passing siding has become unoccupied in the rear of the train. The relay 3CP is inactive until the track section 2—3T becomes unoccupied in the rear of the train under such conditions, because of its circuit being open at front contact 154 of relay 2—3TR. When the track section 2—3T becomes unoccupied in the rear of the train, the relay 3H is picked up upon the reception of a 75 code impulse transmitted from left to right in the siding section, such relay being picked up by the energization of a circuit extending from (+), including front contact 147 of relay 3TP, front contact 148 of relay 3FP, front contact 149 of relay 3FBP, winding of relay 3H, and front contact 150 of relay 2—3TR, to (—).

In accordance with the picking up of relay 3H responsive to a 75 code impulse transmitted from left to right in the track section 3T, the shifting of contact 155 of such relay in the circuit for relay 3CP is effective to condition the relay 3CP to transmit a self-coding impulse upon the dropping away of the relay 3TR at the termination of the impulse being received from the opposite end of the track section. Under such conditions the relay 3CP is energized for the transmission of a self-coding impulse by a circuit extending from (+), including front contact 213 of relay 3FP, back contact 214 of relay 3LGZ, front contact 215 of relay 2—3TR, front contact 155 of relay 3H, winding of relay 3CP, and back contact 156 of relay 3TR, to (—).

The reception at the left-hand end of the siding section of the first self-coding impulse causes the picking up respectively of the relays 8TR, 8TP and 8FP (see Fig. 2D), and the picking up of the relay 8FP conditions the circuit for the relay 8FBP so that such relay is picked up during the "off" period following such self-coding impulse. Upon the dropping away of the relay 8TR at the end of the first self-coding impulse transmitted from right to left in the siding section, the closure of back contact 143 of such relay in the circuit for relay 8CP renders such relay active for the transmission of another 75 code impulse. Such 75 code impulse is transmitted instead of a self-coding impulse because as yet the relay 8H has not been picked up. The reception at the right-hand end of the siding section of that 75 code impulse conditions the relay 3FP for the timing of a second self-coding impulse, such impulse being applied by the picking up of the relay 3CP upon the dropping away of the track relay 3TR at the end of the 75 code impulse transmitted from left to right.

The reception at the left-hand end of the siding section of the second self-coding impulse causes the picking up of the relay 8H by the energization of a circuit extending from (+), including front contact 158 of relay 8TP, front contact 160 of relay 8FP, front contact 161 of relay 8FBP, winding of relay 8H, and front contact 162 of relay 8—9TR, to (—). The picking up of relay 8H, by the shifting of contact 142, is effective to condition the relay 8CP so that it will be active for the transmission of a self-coding impulse from left to right in the siding section upon the dropping away of the relay 8TR at the termination of the second self-coding impulse transmitted from right to left. The relay 8CP is picked up upon the dropping away of the relay 8TR under such conditions by the energization of a circuit extending from (+), including front contact 139 of relay 8FP, back contact 140 of relay 8RGZ, front contact 141 of relay 8—9TR, front contact 142 of relay 8H, winding of relay 8CP, and back contact 143 of relay 8TR, to (—). Thus the conditions of self-coding are restored to normal for the siding section 8—11T associated with the passing siding B after passage of the eastbound train.

*Shut-down of oscillators.*—Inasmuch as the self-coding impulses are measured by the relays FP under normal conditions of the system, the oscillators 180C and 75C are required to be active for forming driven code impulses only upon the establishment of routes involving the track sections with which such oscillators are associated, and only as they are required in the restoration to normal conditions for the conditions of code transmission for the track sections as they become unoccupied in the rear of trains. Thus, the code oscillators can be rendered inactive at each of the signal locations when the H relays for the track sections terminating at such signal locations are both energized. For example, if the relays 4H and 5H for the intermediate signal location illustrated in Fig. 2B are energized, the oscillators 180C and 75C at that location are rendered inactive by the opening of obvious circuits for their control at back contacts 216 and 217 of relays 4H and 5H respectively (see Fig. 5). By this arrangement, the oscillators are rendered active as soon as they are required for the establishment of a route because of a tumble-down or opposing signal interlock effecting the dropping away of either of the two H relays. It will also be readily apparent that by this arrangement, the code oscillators would be rendered active to cause the restoration to normal conditions of self-coding of the system, if either of the H relays were dropped away, due, for example, to the inadvertent shunting of the track rails by a sectionman.

*Following train movements.*—Having considered the conditions of operation of the system upon passage of an eastbound train, and having considered the mode of operation of the system for the clearing of a starting head-block signal and an entering signal, it is believed to be readily apparent to those skilled in the art that a very similar mode of operation is effective in the establishment of routes for following trains. The system is readily adapted for the establishment of routes for following trains in that a control communicated from the control office for the clearing of a signal for the passage of a following train is effective to cause the clearing of that signal, even if the presence of the first train delays the clearing of that signal until such first train has proceeded further along the trackway. For example, with reference to Fig. 6D, a control can be transmitted when a first train occupies the track section 2—5T for the clearing of signal 2A, but the signal 2A can indicate proceed only after the track section 2—5T has become unoccupied in the rear of the first train.

Upon the picking up of the relay 2RGZ, for example, for the clearing of signal 2A for a following train, the opening of back contact 45 (see Fig. 2A) of such relay in the circuit for relay 2CP, is effective to render such relay inactive for the transmission of self-coding impulses when the track section 2—5T becomes unoccupied by the first train. Thus, if the first train were in track section 4—7T and the track section 2—5T were unoccupied in the rear of the train, a 75 driven code would be transmitted from right to left in the track section 2—5T by the energization of a circuit which has been described, but there would be no self-coding impulses interspersed among the 75 code impulses, the absence of self-coding impulses being effective to provide an opposing signal interlock for the opposing signals in the rear of the first train.

*Meeting of trains.*—The mode of operation as it has been described for the passage of an eastbound train is to be considered as typical of the mode of operation upon passage of a westbound train in that the circuits are symmetrical in their organization for both directions of traffic. Therefore, for an understanding of the mode of operation upon the meeting of trains, it is believed necessary to point out only those parts of the circuit organization that relate particularly to the meeting of trains at a passing siding.

The relays CP at the ends of the siding sections for the respective passing sidings have their circuits selected in such a manner as to cause the self-coding normally effective in such sections to be unaffected by the establishment of a route for the passage of a train into the associated passing siding. For example, the circuits are so organized that the control of signal 8B to indicate caution for the passage of a train into the passing siding B does not affect the normal conditions of self-coding in the siding sections 8—11T, but the control of the signal 8A to a proceed indicating position causes a change in the conditions of code transmission in the siding section in a manner which has been described and which is diagrammatically illustrated in Fig. 6C.

Such mode of operation is provided in accordance with a selection in the circuit for relay 8CP (see Fig. 2D) including contacts 218 and 140 of relays 3WR and 8RGZ connected in multiple. If a route is established calling for the track switch 3W to be in its reverse position, the relay 3WR is picked up, and the closure of front contact 218 of such relay connected in multiple with back contact 140 of relay 8RGZ provides that self-coding impulses will continue to be transmitted from left to right in the siding section when the relay 8RGZ is picked up to allow the signal 8B to indicate caution for governing movement of an eastbound train into the passing siding B. It has been pointed out when considering the manner in which the signal 8A for governing through train movements on the main track can be cleared that the opening of back contact of relay 8RGZ under such conditions, with the reverse switch control relay 3WR deenergized, renders the relay 8CP inactive for the transmission of self-coding impulses, and due to the cessation of the transmission of such impulses, a 75 driven code is caused to be transmitted from right to left in the siding section. It will be readily apparent that by this mode of operation the meeting of trains can be accomplished with minimum delay, it being unnecessary under certain conditions for neither train to come to a full stop.

It is believed from the conditions which have been described in combination with the typical mode of operation of the system as it has been set forth upon considering the passage of a train that the entire mode of operation upon the meeting of trains will be readily apparent to those skilled in the art.

*Back-up train movements.*—It is often required in practice that a system of the character of the present invention be adapted to provide for back-up train movements in a stretch of track between passing sidings. In this embodiment of the present invention proceed signal indications are provided for back-up train movements for all intermediate signals encountered in such movements, except the first signal encountered upon the reversal in direction of the movement of a train, such first signal being held at stop. It is the practice of some railroads to require a train making a back-up train movement to flag past the first signal encountered and send the flagman in the direction of the second signal to be encountered to observe its indication. If the second signal encountered indicates proceed, and the train has passed the first signal so as to cause a tumble-down for opposing signal protection, it is safe for the train to proceed with its back-up train movement under signal indication without requiring flagging protection. These conditions are diagrammatically illustrated in Figs. 6H, 6J and 6K.

The typical back-up train movement illustrated is the back-up movement of an eastbound train, after such train has occupied the track section 6—9T, and the track section 4—7T has become unoccupied in the rear of the train as has been described and as is illustrated in Fig. 6F. Assuming the train to desire to make a back-up train movement, it moves by flagging protection to the position illustrated in Fig. 6H where it occupies the track section 4—7T. The entrance of a train into such section causes the dropping away of the relay 4FBP (see Fig. 2B) at the left-hand end of the track section, and the dropping away of that relay is effective to render the code transmitter relay 5CP inactive by the opening of front contact 59, thus providing by a tumble-down arrangement an opposing signal interlock for the opposing starting head-block signals. The dropping away of relay 4FBP is also effective to cause the picking up of the stick relay 5S associated with the signal 5. Relay 5S is picked up under such conditions by the energization of a circuit extending from (+), including front contact 79 of relay 5FBP, back contact 78 of relay 4FBP, back contact 219 of relay 4S, and winding of relay 5S, to (—). The energization of relay 5S provides that the relay 4CP can be active for the transmission of a 75 code, under conditions where the relay 5H is dropped away, but for the typical condition under consideration, it is assumed that the track section 2—5T is unoccupied, and under such conditions, upon the dropping away of the relay 2H at the left-hand end of the track section because of the tumble-down, the relay 2CP (see Fig. 2A) becomes active for the transmission of a 75 code from left to right in the track section 2—5T. The relay 2CP is active under such conditions by the energization of a circuit extending from (+), including contact 190 of oscillator 75C, back contact 191 of relay 3AG, front contact 192 of relay 2—3TR, back contact 47 of relay 2H, winding of relay 2CP, and back contact 48 of relay 2TR, to (—). The reception at the right-hand end of the track section 2—5T of the 75 code maintains the relays 5FBP and 5H picked up, and in accordance therewith, the relay 4CP becomes active for the transmission of a 180 code from left to right in the track section 4—7T. The relay 4CP (see Fig. 2B) is energized for each impulse of the 180 code by a circuit extending from (+), including contact 220 of oscillator 180C, front contact 221 of relay 5H, back contact 152 of relay 4H, winding of relay 4CP, back contact 76 of relay 4S, and back contact 77 of relay 4TR, to (—).

As the train proceeds in its back-up train movement so as to leave the track section 6—9T unoccupied as illustrated in Fig. 6J, the relay 7CP (see Fig. 2C) becomes active for the transmission of a 180 driven code from right to left in the track section 4—7T by the energization of a circuit extending from (+), including contact 110 of oscillator 180C, front contact 109 of relay 6H, back contact 108 of relay 7H, winding of relay 7CP, back contact 111 of relay 7S, and back contact 112 of relay 7TR, to (—).

As the train progresses further in its back-up movement so as to cause the track section 4—7T to become unoccupied as illustrated in Fig. 6K, the relay 4CP (see Fig. 2B) becomes active for the transmission of a 75 driven code in opposition to the 180 driven code applied at the right-hand end of the track section. The relay 4CP is active under such conditions by the energization of a circuit extending from (+), including contact 222 of oscillator 75C, front contact 223 of relay 5S, back contact 221 of relay 5H, back contact 152 of relay 4H, winding of relay 4CP, back contact 76 of relay 4S, and back contact 77 of relay 4TR, to (—). It will be noted that the relay 4H cannot be picked up by the 180 code being transmitted from the right-hand end of the track section 4—7T because its circuit is open at back contact 224 of the stick relay 5S. Thus the relay 4CP will continue to transmit 75 code impulses, but the picking up of the relay 7H at the right-hand end of the track section 4—7T is effective responsive to the 75 code impulses to open the circuit by which the relay 7CP (see Fig. 2C) has been active at back contact 108, and close a circuit by which the relay 7CP becomes active for the transmission of self-coding impulses interspersed alternately among the 75 code impulses in a manner which has been described specifically when considering the conditions involved in the first track section in the rear of an eastbound train upon passage through the stretch of track between the passing sidings A and B.

It will be noted in the diagram of Fig. 6J that the reception of the 75 code at the left-hand end of the track section 6—9T is not effective to cause the relay 6CP to be active for the transmission of self-coding impulses, as the circuit for relay 6CP is open at that time at back contact 86 of the stick relay 6S, the stick relay 6S being maintained picked up by the closure of its pick-up circuit dependent upon the closure of back contact 89 of relay 7FBP in combination with the closure of front contact 88 of relay 6FBP.

Under the conditions diagrammatically illustrated in Fig. 6K, however, the picking up of the relay 7FBP at the right-hand end of the track section 4—7T responsive to the 75 code impulses transmitted from left to right in that track section is effective to open the pick-up circuit by which the relay 6S has been maintained picked up at back contact 89, and thus cause the dropping away of such stick relay. In accordance with the dropping away of the relay 6S, the closure of back contact in the circuit for relay 6CP renders such relay active for the transmission of self-coding impulses from left to right in the track section 6—9T by the energization of a circuit which has been described. The reception at the right-hand end of the track section 6—9T of the self-coding impulses causes the picking up of the code receiving relays 9FP, 9FBP and 9H, and the picking up of such relays is effective to render the relay 9CP active for the transmission of self-coding impulses from right to left interspersed alternately among the self-coding impulses transmitted from the opposite end of the track section.

Having described the conditions involved in the passage of a train in the process of making a back-up train movement to the point illustrated in Fig. 6K, it is believed to be readily apparent, from the description as it has been set forth as to the mode of operation upon the passage of a train in a given direction along the trackway, how the conditions are completely restored for all of the track sections involved in the stretch of track between the passing sidings A and B after the back-up train movement has been completed.

*Outlying switch.*—It is often required in practice that a system of the character of the present invention be adaptable to a condition in which an outlying switch is associated with one or more of the track sections included in the stretch of track between passing sidings. Under such conditions it is desirable that the system be restored to normal upon passage of a train into such outlying switch, after the track switch has been restored to its normal position for through train movements on the main stretch of track. It is to be understood that the conditions involving the use of outlying switches in connection with the system provided by the present invention involve only minor modifications of the circuits as illustrated in this embodiment. In fact, practically the only modification required under such conditions would be the connection of a shunt across the track rails of the track section associated with the outlying switch when such track switch is in its reverse position. This would be accomplished in a manner well known to those familiar with the art.

From the description as it has been set forth, it will be readily apparent that the system is restored to normal upon passage of a train into the outlying switch 5W as illustrated in Fig. 6L, it being assumed that such outlying switch is associated with the track section 4—7T. The condition illustrated in Fig. 6M is that involving the movement of a train into the main stretch of track between the passing sidings A and B from the outlying switch 5W. It is to be understood that such train movement is made only after proper instructions have been issued to the trainman by the dispatcher, as there are no manually controlled signals associated with governing traffic over the outlying switch.

Upon the reversal of the outlying track switch 5W for such train movement, the shunting of the track section 4—7T causes the dropping away of relay 4FBP at the left-hand end of the track section, and the dropping away of such relay closes a circuit to cause the picking up of the stick relay 5S in a manner which has been described when considering back-up train movements. The dropping away of relay 4FBP is also effective to cause the relay 5CP to be rendered inactive as a tumble-down means for interlocking the opposing manually controlled starting head-block signals 2A and 2B at the left-hand end of the stretch of track between the passing sidings A and B. It is believed to be readily apparent that the mode of operation upon movement of the train in the direction of the passing siding A can be effected in a manner corresponding to that which has just been described in detail for the back-up movement of a train in the direction of the passing siding A. Inasmuch as the system is symmetrical in its circuit organization, it will be readily apparent that the conditions affecting the control of signals for the passage of the train in the direction of the passing siding A are typical of the conditions which are established for the passage of the train in the direction of the passing siding B. It is therefore provided, that a train upon entering the stretch of track between the passing sidings A and B from an outlying switch can proceed under automatic signal indications in either direction from the location of such outlying switch to the next passing siding.

It is to be understood that certain features of the present invention, particularly those relative to the self-coding, are applicable to other types of signaling systems. For example, it will be readily apparent that the principle of self-coding can be applied in an absolute-permissive-block signaling system as a potential means for automatically establishing desired direction of driven code transmission by the presence of a train approaching in either direction being effective to initiate a tumble-down of H relays for opposing signals.

Having described a coded track circuit signaling system used in combination with centralized traffic control for a particular stretch of track having passing sidings associated therewith as one specific embodiment of the present invention, it is desired to be understood that this form is selected to facilitate in the disclosure of the invention rather than to limit the number of forms which the invention may assume, and it is to be further understood that various adaptations, alterations and modifications may be applied to the specific form shown to meet the requirements of practice without in any manner departing from the spirit or scope of the present invention except as limited by the appended claims.

What I claim is:

1. In a coded track circuit signaling system, a track section, a code following track relay and a source of current for each end of said track section, impulse forming means at each end of said track section effective to create code impulses, each impulse being formed only in response to the deenergization of the associated track relay upon termination of an impulse received over the track rails of said track section from the opposite end, transmitter means at each end of said track section for alternately connecting said source of current and said track relay at that end across the track rails of the track section in response to the operation of the associated impulse forming means, means for rendering said impulse forming means at the respective ends of the track section effective at the same time and thereby provide impulses alternately in opposite directions, and signaling means at each end of the stretch responsive to the coding operation of the associated track relay.

2. In a coded track circuit signaling system of the character described for a stretch of railway track, a code following track relay at each end of said stretch, a front contact track repeater relay at each end of said stretch, a back contact track repeater relay at each end of said stretch sufficiently slow acting to prevent its following a code when energized only during the "off" periods of such code, a home relay at each end of said stretch sufficiently slow acting to prevent its following a code when energized only during the "on" periods of such code, a code transmitting relay at each end of said stretch, means for energizing said track relay in response to each code impulse transmitted through the track rails to that end of said stretch, means for energizing said front contact track repeater relay in response to the energization of said track relay at that end of the stretch, means for energizing said back contact repeater relay when said code following track relay has dropped away and before said front contact repeater relay has dropped away at that end of the stretch, means for energizing said home relay when said track relay, said front contact track repeater relay, and said back contact track repeater relay are picked up, and means effective when said track relay is dropped away and said front contact track repeater relay is picked up at either end of said stretch for energizing said code transmitting relay at that end and thereby applying a code impulse to the track rails of said stretch, whereby self-coding impulses are transmitted alternately in both directions when the home relays at the opposite ends of the stretch are picked up at the same time.

3. In a coded track circuit signaling system for a stretch of railway track, self-coding impulse transmitting means at each end of said stretch effective when rendered active to transmit code impulses through the track rails, each impulse being transmitted only in response to and upon the termination of an impulse transmitted through the track rails in the opposite direction, driven code impulse transmitting means at each end of said stretch effective when rendered active to transmit driven code impulses through the track rails, means for at times rendering said self-coding impulse transmitting means at one end of said stretch and said driven code impulse transmitting means at the opposite end of the stretch active contemporaneously, and at other times rendering said self-coding impulse transmitting means at the opposite ends of said stretch active contemporaneously, and signal control means at each end of said stretch responsive to code impulses transmitted through the track rails in the direction of that end.

4. In a coded track circuit signaling system for a stretch of railway track, self-coding impulse transmitting means at each end of said stretch effective when rendered active to transmit code impulses through the track rails, each cod impulse being transmitted only in response to and upon the termination of an impulse transmitted through the track rails in the opposite direction, driven code impulse transmitting means at each end of said stretch effective when rendered active to transmit driven code impulses through the track rails, a home relay at each end of said stretch, circuit means for energizing said home relay in response to code impulses transmitted through the track rails in the direction of that end of the stretch, means effective when the home relays for both ends of the stretch are energized for rendering said self-coding impulse transmitting means active at both ends of the stretch contemporaneously, and means effective when said home relay is deenergized at either end of said stretch for rendering said driven code transmitting means active at that end.

5. In a coded track circuit signaling system for a stretch of single track having a signal at each end for governing traffic through such stretch, self-coding impulse transmitting means at each end of said stretch effective when rendered active to transmit code impulses through the track rails, each code impulse being transmitted only in response to and upon the termination of an impulse transmitted through hte track rails in the opposite direction, driven code impulse transmitting means at each end of said stretch effective when rendered active to transmit driven code impulses through the track rails, a home relay at each end of said stretch, circuit means for energizing said home relay in response to code impulses transmitted through the track rails in the direction of that end of the stretch, means effective when the home relays for both ends of the stretch are energized for rendering said self-coding impulse transmitting means active at both ends of the stretch contemporaneously, means effective when said home relay is deenergized at either end of said stretch for rendering said driven code transmitting means active at that end, and means for causing each of said signals to indicate proceed only if said home relay at that end of the stretch is energized.

6. In a coded track circuit signaling system for a stretch of railway track, self-coding impulse transmitting means at each end of said stretch effective when rendered active to form and transmit relatively long code impulses through the track rails, each code impulse being transmitted only in response to and upon the termination of an impulse transmitted through the track rails in the direction of that end of the stretch, driven code impulse transmitting means at each end of said stretch effective when rendered active to transmit driven code impulses through the track rails at a selected rate, the impulses of any rate selected being substantially shorter than the impulses formed by said self-coding impulse transmitting means, means for at times rendering said self-coding impulse transmitting means at one end of said stretch and said driven code impulse transmitting means at the opposite end of said stretch active contemporaneously, and at other times rendering said self-coding impulse transmitting means at the opposite ends of said stretch active contemporaneously, and signal control means at each end of said stretch responsive to code impulses transmitted through the track rails in the direction of that end.

7. In a coded track circuit signaling system for a stretch of railway track, self-coding impulse transmitting means at each end of said stretch effective when rendered active to form and transmit relatively long code impulses through the track rails, each impulse being transmitted only in response to and upon the termination of an impulse transmitted through the track rails from the opposite end of the stretch, driven code forming means at each end of the stretch for forming impulses at a given rate, the length of the impulses and of the "off" periods between impulses being substantially half the length of the impulses formed by said self-coding impulse transmitting means, driven code impulse transmitting means at each end of the stretch effective when rendered active to transmit the impulses formed by said driven code impulses forming means at that end, such means being ineffective to apply an impulse to the track rails of said stretch when such rails are energized by an impulse transmitted from the opposite end of the stretch, and means for at times rendering said self-coding impulse transmitting means active at both ends of the stretch contemporaneously, and at other times rendering said self-coding impulse transmitting means at one end of the stretch and said driven code impulse transmitting means at the other end of the stretch active contemporaneously, whereby the impulses are transmitted through the rails in alternate relationship for the opposite directions of code transmission without the length of the impulses being altered by one transmitting means interfering with the other, the resultant in the case of a combination of impulses transmitted by said self-coding impulse transmitting means and said driven code transmitting means for the opposite ends of the stretch being that only alternate impulses formed by said driven code forming means are transmitted by the driven code impulse transmitting means at that end of the stretch.

8. In a coded track circuit signaling system for a stretch of railway track, self-coding impulse transmitting means at one end of said stretch effective when rendered active to form and transmit relatively long code impulses through the track rails, each impulse being transmitted only in response to and upon the termination of an impulse transmitted through the track rails in the direction of that end of the stretch, driven code forming means at the other end of the stretch for forming impulses at a given rate, the length of the impulses and of the "off" periods between impulses being substantially half the length of the impulses formed by said self-coding impulse transmitting means, driven code transmitting means at said other end of the stretch effective when rendered active to transmit the impulses formed by said driven code forming means at that end, such means being ineffective to apply an impulse to the track rails of said stretch when such rails are energized by an impulse transmitted from the opposite end of the stretch, and means for rendering said self-coding impulse transmitting means and said driven code impulse transmitting means active at opposite ends of said stretch at the same time, whereby impulses are transmitted through the track rails in opposite directions alternately without interference, only alternate impulses formed by said driven code forming means being transmitted by said driven code impulse transmitting means because of the relative length of the impulses transmitted by the transmitting means at the respective opposite ends of said stretch.

9. In a coded track circuit signaling system for a stretch of railway track, self-coding impulse transmitting means at each end of said stretch effective when rendered active to form code impulses and transmit such impulses through the track rails, each impulse being formed only in response to and upon the termination of an impulse transmitted through the track rails in the opposite direction, driven code impulse transmitting means at each end of the stretch effective when rendered active to transmit driven code impulses through the track rails, means for first rendering said driven code impulse transmitting means at one end of the stretch and said self-coding impulse transmitting means at the other end of the stretch active contemporaneously, and secondly rendering said self-coding impulse transmitting means active for both ends of said stretch contemporaneously, such means being effective to shift from such first to such second condition of code transmission in said stretch at a time when it will be insured that there will be an impulse transmitted to the second of the self-coding impulse transmitting means to be rendered active to provide a basis for forming the first impulse to be transmitted by such second self-coding impulse transmitting means, and signaling means at each end of the stretch responsive to code impulses transmitted through the track rails to that end.

10. In a coded track circuit signaling system for a stretch of railway track, self-coding impulse transmitting means at each end of said stretch effective when rendered active to form code impulses and transmit such code impulses through the track rails, each of such impulses being formed only in response to and upon the termination of an impulse transmitted through the track rails in the direction of that end of the stretch, driven code impulse transmitting means at a given end of the stretch effective when rendered active to transmit driven code impulses through the track rails, means for first rendering said driven code impulse transmitting means at said given end of the stretch and said self-coding impulse transmitting means at the other end of the stretch active contemporaneously, and secondly rendering said self-coding impulse transmitting means active at both ends of the stretch contemporaneously, such means being effective to shift from such first to such second condition of code transmission in said stretch during the transmission of an impulse in the direction of said given end of the stretch, and signaling means at each end of the stretch responsive to code impulses transmitted through the track rails to that end.

11. In a coded track circuit signaling system of the character described for a stretch of single track, signals normally at stop at each end of the stretch for governing traffic into and out of such stretch, track circuit code transmitting means at each end of the stretch for transmitting when rendered active code impulses at selected high, medium or low rates, means for rendering said code transmitting means at both ends of said stretch normally active for the transmission of codes at said low rate when said signals governing entrance to said stretch at both ends are at stop, manually controlled means for governing the clearing of the signal at either selected end of said stretch for governing traffic into that stretch, such means being effective to cause that signal to indicate caution if said medium rate code is transmitted to that signal through the track rails of said stretch and to indicate clear if said high rate is transmitted to that signal through the track rails of said stretch, and means responsive to said manually controlled means for either signal for rendering said track circuit code transmitting means active at the opposite end of the stretch to transmit at either said high or said medium rate, dependent upon whether said signal for governing traffic out of said stretch at such opposite end indicates proceed or stop.

12. In a coded track circuit signaling system of the character described for a stretch of railway track, signals at the respective ends of said stretch for governing entrance thereto in both directions, self-coding impulse transmitting means at each end of the stretch normally active to form code impulses and transmit such impulses through the track rails of said stretch, each impulse being formed and transmitted only in response to and upon the termination of an impulse transmitted through the track rails in the direction of that end of the stretch, driven code impulse transmitting means at each end of the stretch effective when rendered active to transmit driven code impulses through the track rails, manually controlled means for governing the clearing of either selected one of said signals, such means being effective to clear such signal only in response to the transmission of a track circuit code through the track rails of said stretch to such signal, means responsive to said manually controlled means for governing the clearing of a signal for rendering said self-coding impulse transmitting means inactive at the corresponding end of said stretch, and means for rendering said driven code impulse transmitting means active upon the cessation of track circuit code transmission to that end of the stretch.

13. In a coded track circuit signaling system for railroads, a stretch of railway track, semi-automatic signals at the ends of said stretch for governing entrance thereto, signal control means for each of the signals for, when manually actuated to one position, causing that signal to indicate proceed, and, when actuated to another position, causing that signal to indicate stop, self-coding impulse transmitting means at each end of the stretch effective only when said signal control means for the signal at that end is actuated to said another position for forming and transmitting code impulses through the track rails, each impulse being formed and transmitted only in response to and upon the termination of an impulse transmitted through the track rails in the direction of that end of the stretch, driven code transmitting means at each end of the stretch effective when rendered active to transmit driven code impulses through the track rails, means at each end of the stretch effective upon the cessation of code transmission through the track rails from the opposite end of the stretch for rendering said driven code transmitting means active at that end, and means for governing the clearing of said signals only in response to driven code pulses transmitted over the track rails of the stretch toward that signal.

14. In a coded track circuit signaling system for railroads, a stretch of track divided into a plurality of track sections and having signals at intervals governing train movements into and through said stretch, self-coding impulse transmitting means at each end of each of the track sections for forming code impulses and transmitting such impulses through the track rails of that track section, such self-coding means being normally active for both ends of said track section, but being effective to form and transmit each impulse only in response to and upon the termination of an opposing impulse transmitted through the track rails of that track section, normally inactive driven code forming means at the ends of the track sections effective when rendered active to form clear and caution code rates, driven code impulse transmitting means effective when rendered active to transmit impulses at selected rates formed by said driven code forming means through the track rails, manually controlled means for rendering said self-coding impulse transmitting means inactive at either end of said stretch when it is desired to establish a route for a train, means responsive to the cessation of code transmission through the track rails to an end of one of the track sections for rendering said driven code forming means and said driven code transmitting means active at that end, and signal control means for each of the signals governed by said clear and caution codes transmitted toward that signal over the track rails of the track section in advance thereof.

15. In a coded track circuit signaling system of the character described for a stretch of track divided into a plurality of track sections and having signals at intervals governing train movement into and through such stretch, track circuit transmitting means at each end of said stretch normally active to transmit code impulses through the track rails, the impulses transmitted in opposite directions through each track section being interspersed among each other, and the code transmitting means for the intermediate track sections being active in accordance with the transmission of code in a corresponding direction to the adjacent end of the adjacent track section, manually controlled means for rendering said track circuit code transmission means inactive at either selected end of said stretch and thereby causing a tumble-down of the corresponding track circuit code transmitting means successively for the other track sections to the opposite end of the stretch, a directional stick relay for each of the intermediate signals, means responsive to said tumble-down at each of the intermediate signals for picking up said stick relay for each of such signals governing passage of a train entering at the end of said stretch at which such tumble-down has been initiated, stick circuit means for maintaining each of said stick relays energized after it has been picked up until after passage of a train past that signal, means effective upon passage of a train past each of the intermediate signals to render said track circuit code transmitting means active if said stick relay for that signal is picked up to transmit a code through the track rails for governing the next signal in the rear of the train, and means for causing each of the signals to indicate proceed only if a track circuit code is transmitted through the track rails to such signal in the track section in advance thereof.

16. In a coded track circuit signaling system of the character described for a stretch of railway track divided into a plurality of track sections, a signal at each end of said stretch for governing entrance thereto, self-coding impulse transmitting means at each end of each of the track sections normally active to form code impulses and transmit such impulses through the track rails of that track section, each impulse being formed and transmitted only in response to and upon the termination of a code impulse transmitted through the track rails of that track section to that end of the section, and such means associated with each end of each intermediate track section being rendered normally active only in response to the reception of track circuit code impulses at the adjacent end of the adjacent track section, driven code transmitting means at each end of each of the track sections effective when rendered active to transmit driven code impulses through the track rails of that track section, means for rendering said driven code impulse transmitting means active upon the cessation of track circuit code transmission through the track rails of that track section to that end of the section, manually controlled means for governing the clearing of either selected one of said signals, such means being effective to clear such signal only in response to the transmission of a track circuit code to such signal through the track rails of the track section in advance thereof, and means responsive to said manually controlled means for governing the clearing of a signal for rendering said self-coding impulse transmitting means inactive at the corresponding end of said stretch and thereby rendering inactive the self-coding impulse transmitting means at the corresponding ends of each of the other track sections included in said stretch to provide an opposing signal interlock for the signal at the opposite end of the stretch.

17. In a coded track circuit signaling system for a stretch of single track between the ends of passing sidings divided into a plurality of track sections and having signals governing train movement in opposite directions into and through the stretch, one of said track sections including an outlying track switch, a code following track relay at each end of each track section responsive to code impulses transmitted through the track rails from the opposite end of that track section, self-coding impulse transmitting means normally active at the opposite ends of each track section for transmitting impulses alternately in opposite directions through the track rails of that track section to energize intermittently said track relay at each end of such section, such means being effective to form and transmit each impulse only in response to and upon the termination of an impulse transmitted through the track rails from the opposite end of that track section, driven code impulse transmitting means at each end of each of the track sections effective when rendered active to transmit driven code impulses through the track rails of that track section, code responsive means responsive to the cessation of the coding operation of each track relay except those at the extreme ends of said stretch for rendering ineffective said self-coding impulse transmitting means at the adjacent end of the adjacent track section, means at each end of each of the track sections for rendering active said driven code impulse transmitting means at that end responsive to the cessation of the transmission of code impulses through the track rails from the opposite end of that track section, and signal control means for each of the signals except the signals at the extreme ends of said stretch for causing such signal to indicate proceed when and only when code impulses are transmitted to such signal through the track rails in the track section in advance thereof, whereby the entrance of a train into the stretch from said outlying switch is effective to put the signals governing opposing train movement in both directions toward that switch at stop and permit the signals governing train movement from said switch toward either end of the stretch to be controlled by code impulses to indicate proceed.

18. In a coded track circuit signaling system for railroads, the combination with a track section, of means at each end of said track section comprising a source of current, a track relay, a transmitter relay for connecting said source of current and said track relay alternately across the track rails of said track section, a slow-acting repeater track relay, circuit means for energizing said transmitter relay upon deenergization of said track relay until said repeater relay has responded to such denergization, and means for at times rendering said circuit means for both ends of said track section effective at the same time and thereby cause transmission of current pulses alternately in opposite directions by the self-coding operation of said relays associated with the opposite ends of said track section.

19. In a coded track circuit signaling system for railroads, a track section, a code following track relay and a source of current for each end of said track section, a transmitter relay at each end of said track section for connecting the associated track relay and source of current alternately across the track rails of said track section, code responsive means for each end of said track section energized by the coded operation of the corresponding track relay, and means for each end of said track section responsive to the deenergization of the associated track relay after each energization thereof and only if the associated code responsive relay is energized for energizing the associated transmitter relay for a limited time to send a current pulse toward the opposite end of said track section.

20. In a coded track circuit signaling system for railroads, a track section, a code following track relay and a source of current for each end of said track section, a transmitter relay at each end of said track section for connecting the associated track relay and source of current alternately across the track rails of said track section, code responsive means for each end of said track section energized by the coded operation of the corresponding track relay, a slow-acting repeater relay for each track relay, and means associated with each transmitter relay and effective only if the associated code responsive relay is energized for operating said transmitter relay for each deenergization of the associated track relay until its repeater relay has responded to such deenergization, whereby current pulses may be transmitted alternately in opposite directions over said track section by the self-coding operation of the track relays and transmitter relays at the opposite ends of that track section.

21. In a coded track circuit signaling system for railroads, a track section, a source of current and a code following track relay for each end of said track section, code responsive means for each end of said track section energized by the recurrent energization of the associated track relay, means for each end of said track section effective only if the associated code responsive means is energized to connect the associated source of current to said track section for a limited time in response to the deenergization of the associated track relay upon cessation of a current pulse from the opposite end of the track section, means including intermittently operated coding contacts for applying code pulses to said track section at each end when the associated code responsive means is deenergized, and means for at times stopping transmission of code pulses from one end of said track section and thereby deenergize the code responsive means at the opposite end and cause transmission of driven code pulses from that opposite end in accordance with traffic conditions.

22. In a coded track circuit signaling system for railroads, a track section, a code following track relay and a source of current for each end of said track section, a transmitter relay at each end of said track section operating when energized and deenergized respectively to connect said source of current and said track relay across the track rails of said track section, a slow-acting repeater relay for each track relay, intermittently operated coding contacts for each end of said track section, two operating circuits for each transmitter relay both including a back contact of the associated track relay, one of said operating circuits also including a contact of the associated repeater relay, the other of said operating circuits including the associated intermittently operated coding contacts, and code responsive means for each end of said track section energized by the intermittent operation of the associated track relay for selectively governing said operating circuits for the associated transmitter relay.

23. In a coded track circuit signaling system, a track section, a code following track relay and a slow-acting repeater relay for each end of said track section, transmitting means for energizing the track rails of said track section at each end in response to the deenergization of the associated track relay and during the operating time of the associated repeater relay, code responsive means for each track relay maintained energized by the intermittent operation thereof for rendering the associated transmitting means effective, and means including intermittently operated coding contacts for at times applying driven code pulses to said track section at either end while the associated code responsive means is deenergized.

24. In a coded track circuit signaling system of the character described, the combination with a track section, a code following track relay and a slow-acting repeater relay for each end of said track section, code responsive means energized by the recurrent energization of each track relay, a transmitter relay for each end of said track section acting to connect a source of current to said track section, means for energizing each transmitter relay only if the associated code responsive means is energized and when the corresponding track relay is deenergized during the operating time of the associated master relay, means manually controlled from a distant control point for rendering said means ineffective at either selected end of said track section, and means including intermittently operating coding contacts for governing the operation of each transmitter relay when the associated code responsive means is deenergized.

HAROLD S. WYNN